US012656115B2

(12) United States Patent　　(10) Patent No.:　US 12,656,115 B2
Gould et al.　　(45) Date of Patent:　Jun. 16, 2026

(54) LASER LEVEL WITH ADJUSTABLE DIRECT PROJECTION TO TARGETS

(71) Applicant: Milwaukee Electric Tool Corporation, Brookfield, WI (US)

(72) Inventors: Samuel A. Gould, West Allis, WI (US); Danielle K. Quan, Milwaukee, WI (US); Dennis Y. Wong, Glendale Heights, IL (US); Todd P. Kusik, Wauwatosa, WI (US); George I. Roudebush, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 455 days.

(21) Appl. No.: 18/476,915

(22) Filed: Sep. 28, 2023

(65) Prior Publication Data

US 2024/0159532 A1　　May 16, 2024

Related U.S. Application Data

(60) Provisional application No. 63/383,134, filed on Nov. 10, 2022.

(51) Int. Cl.
*G01C 15/10*　　(2006.01)
(52) U.S. Cl.
CPC .................................. *G01C 15/105* (2013.01)
(58) Field of Classification Search
CPC ............................ G01C 15/105; G01C 15/004
See application file for complete search history.

(56) References Cited

U.S. PATENT DOCUMENTS

| | | | |
|---|---|---|---|
| 4,541,712 | A | 9/1985 | Whitney |
| RE33,931 | E | 5/1992 | Whitney |
| 5,680,208 | A | 10/1997 | Butler et al. |
| 5,754,287 | A | 5/1998 | Clarke |
| 5,790,248 | A | 8/1998 | Ammann |
| 5,872,657 | A | 2/1999 | Rando |
| 5,900,931 | A | 5/1999 | Rando |
| 5,929,984 | A | 7/1999 | Hamar |
| 6,005,719 | A | 12/1999 | Rando |
| 6,184,979 | B1 | 2/2001 | Hirano et al. |
| 6,351,890 | B1 | 3/2002 | Williams |
| 6,459,483 | B1 | 10/2002 | Shafer et al. |
| 6,542,304 | B2 | 4/2003 | Tacklind et al. |
| 6,657,788 | B2 | 12/2003 | Tacklind et al. |
| 6,741,343 | B2 | 5/2004 | Shafer et al. |
| D498,687 | S | 11/2004 | Lopano |

(Continued)

FOREIGN PATENT DOCUMENTS

| | | |
|---|---|---|
| CN | 107525499 | 12/2017 |
| DE | 2157113 | 5/1972 |

(Continued)

*Primary Examiner* — Yaritza Guadalupe-McCall
(74) *Attorney, Agent, or Firm* — Reinhart Boerner Van Deuren s.c.

(57)　　ABSTRACT

A laser level receives information describing a series of install points. The laser level than projects one or more laser beams at the install point(s), such as a planar laser beam along the run and a targeting laser beam at the point selected by the user. After the user finishes work on a first install point, the user can instruct the laser level to project the targeting laser beam at the next point, such as the user sending the instruction wirelessly.

20 Claims, 22 Drawing Sheets

(56) References Cited

U.S. PATENT DOCUMENTS

| | | | |
|---|---|---|---|
| 6,829,834 | B1 | 12/2004 | Wolf et al. |
| 6,848,188 | B2 | 2/2005 | Tacklind et al. |
| D509,453 | S | 9/2005 | Lopano |
| D526,587 | S | 8/2006 | Lopano |
| 7,134,211 | B2 | 11/2006 | Bascom et al. |
| 7,310,886 | B2 | 12/2007 | Bascom et al. |
| 7,409,312 | B1 * | 8/2008 | Conner ................ G01C 15/004 |
| | | | 702/159 |
| 7,481,002 | B2 | 1/2009 | Bascom et al. |
| 7,571,546 | B1 | 8/2009 | Sergyeyenko et al. |
| 7,979,993 | B2 | 7/2011 | Tippett et al. |
| 7,992,310 | B2 | 8/2011 | Litvin et al. |
| 8,006,394 | B2 | 8/2011 | Tippett et al. |
| 8,031,332 | B2 | 10/2011 | Miller et al. |
| 8,087,176 | B1 | 1/2012 | Hayes et al. |
| 8,269,612 | B2 | 9/2012 | Horky et al. |
| 8,281,495 | B2 | 10/2012 | Hayes et al. |
| 8,307,562 | B2 | 11/2012 | Bascom et al. |
| 8,595,946 | B2 | 12/2013 | Hayes et al. |
| 8,640,350 | B2 | 2/2014 | Bascom et al. |
| 8,745,884 | B2 | 6/2014 | Hayes |
| 8,943,701 | B2 | 2/2015 | Hayes et al. |
| 9,110,308 | B2 | 8/2015 | Zimmermann |
| 9,207,078 | B2 | 12/2015 | Schorr et al. |
| 9,389,076 | B2 | 7/2016 | Horky et al. |
| 9,453,719 | B2 | 9/2016 | Schorr et al. |
| 9,880,022 | B1 * | 1/2018 | Unger ................ G01C 15/002 |
| 10,145,676 | B2 * | 12/2018 | Hayes ..................... G01S 17/89 |
| 10,545,021 | B2 | 1/2020 | Horky et al. |
| 10,598,490 | B2 | 3/2020 | Yong et al. |
| 10,935,369 | B2 * | 3/2021 | Hayes ..................... G06F 15/00 |
| 11,035,671 | B2 | 6/2021 | Horky et al. |
| 11,378,385 | B2 * | 7/2022 | Beckwith ............... G01S 17/08 |
| 11,435,182 | B2 | 9/2022 | Hajmousa et al. |
| 11,435,445 | B2 | 9/2022 | Snyder et al. |
| 11,754,393 | B2 * | 9/2023 | Gould .................. G01C 15/004 |
| | | | 33/228 |
| 12,152,882 | B2 * | 11/2024 | Gould .................. G01C 15/006 |
| 2004/0085646 | A1 | 5/2004 | Tacklind et al. |
| 2008/0052926 | A1 | 3/2008 | Parel et al. |
| 2015/0160000 | A1 | 6/2015 | Hayes et al. |
| 2018/0328729 | A1 | 11/2018 | Turner et al. |
| 2021/0124049 | A1 | 4/2021 | Wohlgenannt et al. |
| 2021/0190915 | A1 * | 6/2021 | Snyder .................. G01S 7/4861 |
| 2021/0254974 | A1 | 8/2021 | Horky et a. |
| 2022/0099440 | A1 * | 3/2022 | Unger .................... G01C 15/06 |
| 2022/0170744 | A1 | 6/2022 | Gould et al. |
| 2022/0404499 | A1 * | 12/2022 | Narumi ................ G01S 7/4817 |
| 2023/0119676 | A1 * | 4/2023 | Roudebush .......... G01C 15/105 |
| | | | 33/228 |
| 2024/0116168 | A1 * | 4/2024 | Gould ...................... B25H 7/00 |
| 2024/0159532 | A1 * | 5/2024 | Gould .................. G01C 15/004 |
| 2024/0261025 | A1 * | 8/2024 | McLoughlin ........ A61B 1/0655 |
| 2025/0044089 | A1 * | 2/2025 | Gould .................. G01C 15/006 |
| 2026/0016577 | A1 * | 1/2026 | Kiyohara .............. G01S 7/4915 |

FOREIGN PATENT DOCUMENTS

| | | |
|---|---|---|
| DE | 20215235 | 2/2003 |
| EP | 1528359 | 5/2005 |
| EP | 3901576 | 10/2021 |
| JP | 2006058153 | 3/2006 |
| JP | 2021113686 | 8/2021 |
| WO | WO0225210 | 3/2002 |
| WO | WO05079382 | 9/2005 |
| WO | WO08011398 | 1/2008 |
| WO | WO22111994 | 6/2022 |
| WO | WO22111995 | 6/2022 |
| WO | WO2022119818 | 6/2022 |
| WO | WO2022221141 | 10/2022 |
| WO | WO2023039238 | 3/2023 |

* cited by examiner

260

260

262

264

266

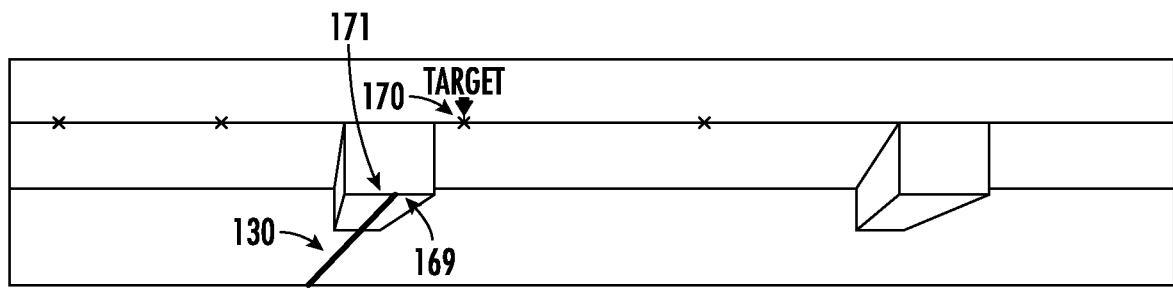
FIG. 31
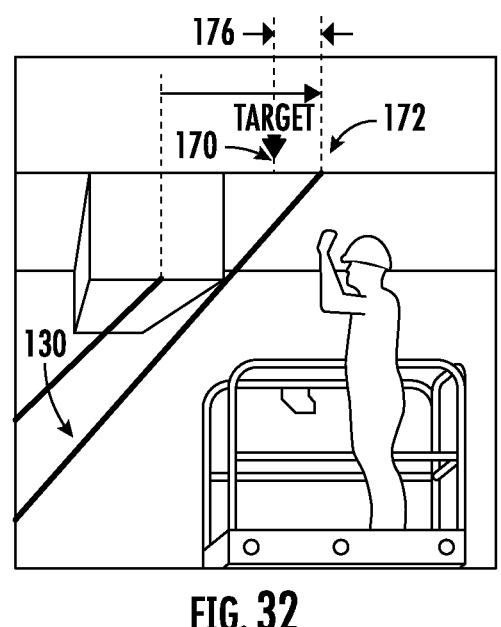
FIG. 32
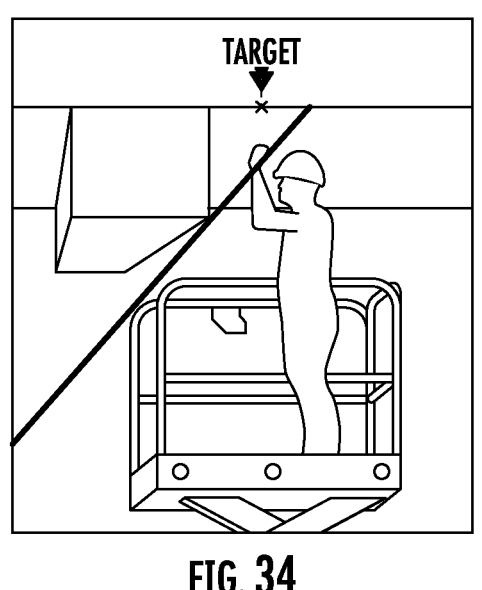
FIG. 34
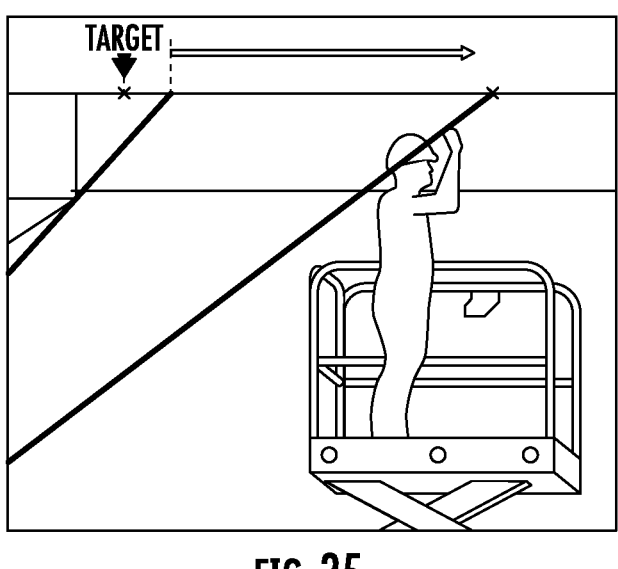
FIG. 33
FIG. 35

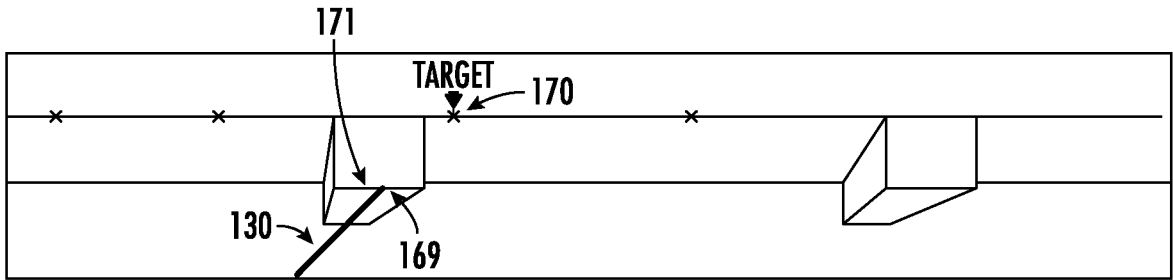
FIG. 36
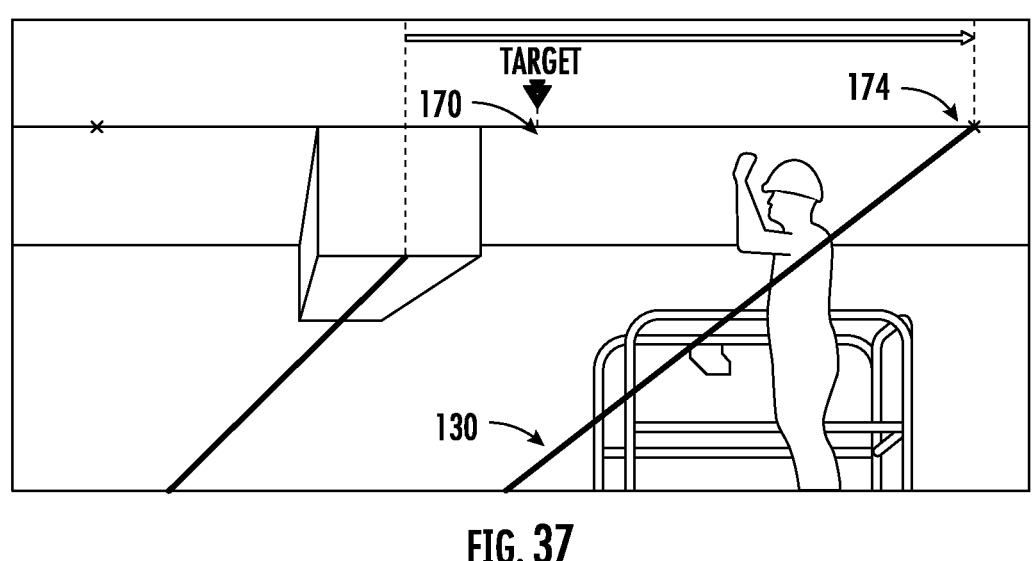
FIG. 37
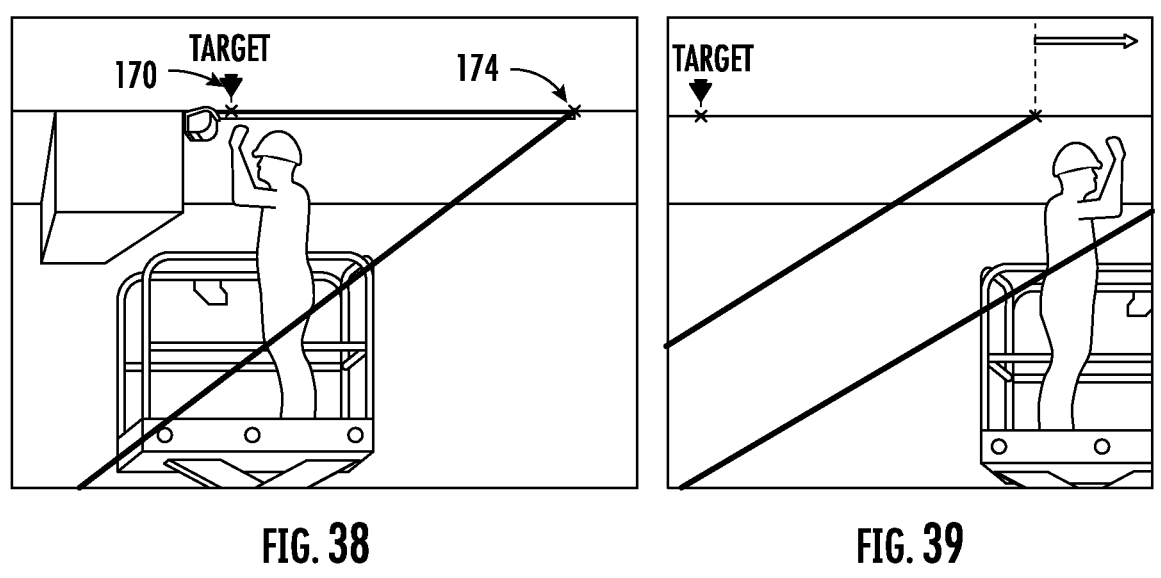
FIG. 38                    FIG. 39

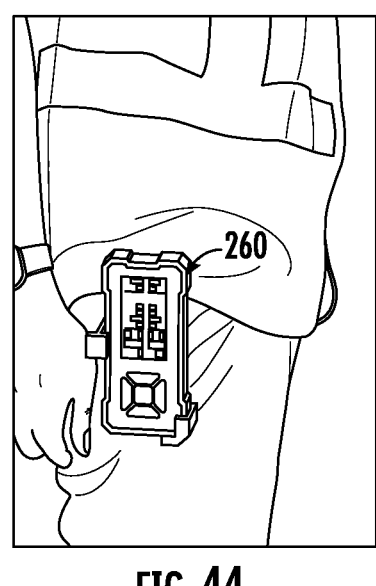
FIG. 44
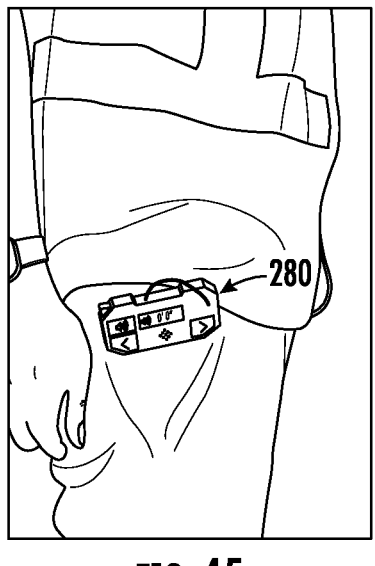
FIG. 45
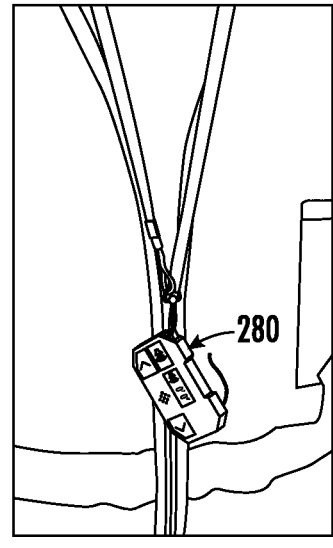
FIG. 46
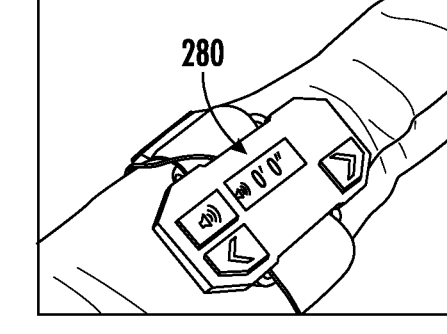
FIG. 47
FIG. 48
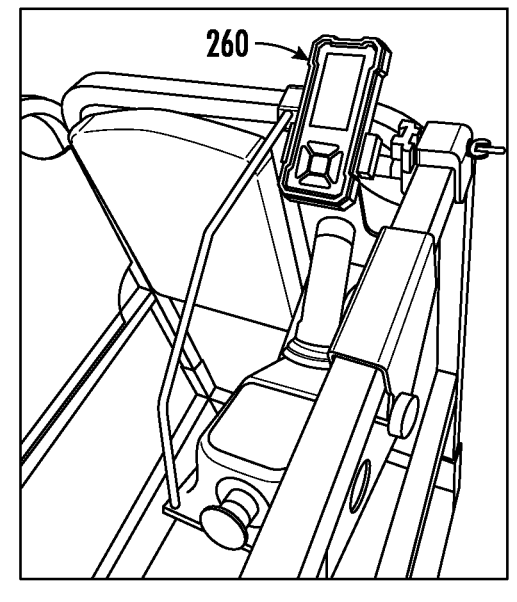
FIG. 49
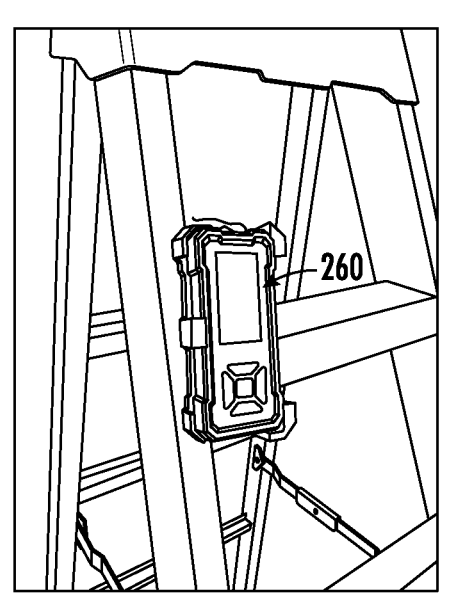
FIG. 50

410

410

450

450

470

470

LASER LEVEL WITH ADJUSTABLE DIRECT PROJECTION TO TARGETS

CROSS-REFERENCE TO RELATED PATENT APPLICATION

The present application claims the benefit of and priority to U.S. Application No. 63/383,134 filed on Nov. 10, 2022, which is incorporated herein by reference in its entirety.

BACKGROUND OF THE INVENTION

The present disclosure is directed generally to laser levels. The present disclosure relates specifically to point line plane laser levels with direct projection to one or more target points, such as evenly spaced target points on a ceiling.

SUMMARY OF THE INVENTION

One embodiment of the invention relates to a laser generating assembly including a housing, a first laser generation device coupled to the housing, a second laser generation device coupled to the housing, and a controller coupled to the housing. The first laser generation device is configured to generate a first output laser beam of light along a first plane, the first output laser beam of light intersecting an upper surface above the housing to form a first line on the upper surface that extends away from the housing. The second laser generation device is configured to generate a targeting laser beam of light, the targeting laser beam of light projected at the upper surface at a first target intersecting the first line. The controller is configured to receive a first signal indicating that the targeting laser beam of light is intersecting a third surface at a first location, the first target being a non-zero first lateral distance from the housing and the first location being a non-zero second lateral distance from the housing that is less than the first lateral distance. The controller is configured to calculate a difference between the first lateral distance and the second lateral distance, generate a second signal indicating the difference, and transmit the second signal to a remote device configured to receive the second signal and provide an indication to a user that identifies the difference.

Another embodiment of the invention relates to a laser generating assembly including a housing, a first laser generation device coupled to the housing, a second laser generation device coupled to the housing, and a controller. The first laser generation device is configured to generate a first output laser beam of light along a first plane, the first output laser beam of light intersecting an upper surface above the housing to form a first line on the upper surface that extends away from the housing. The second laser generation device is configured to generate a targeting laser beam of light, the targeting laser beam of light projected at the upper surface at a first target intersecting the first line. The controller is configured to receive a first signal to adjust the aim of the targeting laser beam of light so the targeting laser beam of light intersects the first line at a first alternate location, calculate a non-zero lateral distance between the first alternate location and the first target, generate a second signal indicating the lateral distance, and transmit the second signal to a remote device configured to receive the second signal and display an indication to a user that identifies the lateral distance.

Another embodiment of the invention relates to a laser generating assembly including a housing, a first laser generation device coupled to the housing, a second laser generation device coupled to the housing, and a second laser generation device coupled to the housing, and a controller. The first laser generation device is configured to generate a first output laser beam of light along a first plane, the first output laser beam of light intersecting an upper surface above the housing to form a first line on the upper surface that extends away from the housing. The second laser generation device is configured to generate a targeting laser beam of light, the targeting laser beam of light projected at the upper surface at a first target of a plurality of targets, the first target intersecting the first line. The controller is configured to receive a first signal to adjust the aim of the targeting laser beam of light to a first alternate location intersecting the first line, calculate a non-zero lateral distance between the first alternate location and the first target, and receive a second signal to adjust a location for each of the plurality of targets that are subsequent to the first target by the lateral distance.

Another embodiment of the invention relates to a laser beam generating device including a housing, one or more laser diodes, and a controller. The one or more laser diodes are configured to emit a first laser beam vertically downward from the housing, the first laser beam forming a first point of light on one or more surfaces, a first laser beam plane emitted from the housing, the first laser beam plane forming a first line of light on the one or more surfaces, the first line of light extending away from the first point of light, a second laser beam plane emitted forward from the housing, the second laser beam plane forming a second line of light that is horizontal on the one or more surfaces, and a targeting laser beam emitted from the housing to form a target image intersecting the first line of light. In another specific embodiment, the only laser beams the laser beam generating device are configured to emit are the first laser beam, the first laser beam plane, the second laser beam plane, and the targeting laser beam. In a specific embodiment, the one or more laser diodes are supported on a self-leveling platform, such as via a pendulum (e.g., all of the laser diodes on the laser level are supported on the self-leveling pendulum).

The controller is configured to receive information identifying a plurality of targets, receive a first control signal to emit the targeting laser beam at a first target of the plurality of targets, and in response to receiving the first control signal, adjusting the targeting laser beam such that the target image is projected to intersect the first line of light at the first target. In various embodiments the adjusting the targeting laser beam is based on a height of the surface having the first target, and an angle the targeting laser beam is being emitted relative to the self-leveling platform.

In various embodiments, the laser beam generating device includes a laser distance measurer configured to measure a distance from the laser beam generating device to an upper surface of the one or more surfaces above the laser beam generating device. The controller is configured to receive a first information signal from the laser distance measurer, the first information signal indicating a distance to the upper surface above the laser beam generating device, the first line of light being generated at least in part on the upper surface.

In various embodiments, the controller is configured to receive a second control signal to adjust the targeting laser beam from the first target, and in response to receiving the second control signal, adjusting the targeting laser beam a first adjustment distance such that the target image intersects the first line of light at a location the first adjustment distance from the first target. In various embodiments, the second control signal instructs the laser beam generating device to move the targeting laser beam such that the target image intersects the first line of light at a second target of the plurality of targets that is distinct from the first target. In various embodiments, the second control signal instructs the laser beam generating device to move the target image linearly along the first line of light at a constant speed. In various embodiments, the second control signal instructs the laser beam generating device to initially move the target image linearly along the first line of light at a first speed for a threshold period of time, and subsequent to the threshold period of time at a second speed greater than the first speed.

In various embodiments, the controller is configured to receive a third control signal to reset each of the targets in the plurality of targets subsequent to the first target, and in response to receiving the third control signal, adjusting each target in the plurality of targets subsequent to the first target by the first adjustment distance. In various embodiments, the laser beam generating device includes a leveling system configured to orient the housing in a level orientation.

An exemplary method of using an embodiment of a laser beam generating device includes emitting a first laser beam vertically upward, the first laser beam forming a first point of light on one or more surfaces, emitting a second laser beam vertically downward, the second laser beam forming a second point of light on the one or more surfaces, emitting a first laser beam plane, the first laser beam plane forming a first line of light on the one or more surfaces, emitting a second laser beam plane, the second laser beam plane forming a second line of light that is horizontal on the one or more surfaces, emitting a targeting laser beam to form a target image intersecting the first line of light, receiving information identifying a plurality of targets, receive a first signal to emit the targeting laser beam at a first target of the plurality of targets, and in response to receiving the first signal, adjusting the targeting laser beam such that the targeting laser beam is projected to intersect the first line of light at the first target.

In various embodiments, the method includes detecting an obstruction that the targeting laser beam is intersecting, and in particular detecting the targeting laser beam is forming the target image at a location other than the first target. In various embodiments, the method includes generating an alert in response to detecting the obstruction. In various embodiments, the method includes, in response to detecting the obstruction, sending an alert signal to a remote that is controlling the laser beam generating device.

Another embodiment of the invention relates to a laser beam generating system including a laser beam generating device and a remote configured to send control signals to the laser beam generating device. The laser beam generating device includes a housing, a leveling system configured to orient the housing in a level orientation, one or more laser diodes, and a controller. The one or more laser diodes are configured to emit a first laser beam plane emitted from the housing, the first laser beam plane forming a first line of light on one or more surfaces, and a targeting laser beam emitted from the housing to form a target image intersecting the first line. The controller is configured to receive information identifying a plurality of targets, receive a first signal to emit the targeting laser beam at a first target of the plurality of targets, and in response to receiving the first signal, adjusting the targeting laser beam such that the target image is projected to intersect the first target. The laser beam generating device moves the targeting laser beam in response to receiving the control signals from the remote.

In various embodiments, the remote is configured to send to the laser beam generating device the information identifying the plurality of targets. In various embodiments, the remote is configured to receive an alert signal that the laser beam generating device detected an obstruction, and, in response to receiving the alert signal, generating an alert. In various embodiments, the alert is selected from the group consisting of an audio alert, a warning message on a screen of the remote, and a haptic signal.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIGS. 31-35 are a series of schematic side views for installing at a target point for which the targeting laser beam is obstructed from intersecting the target point, according to an exemplary embodiment.

FIGS. 36-39 are a series of schematic side views for installing at a target point for which the targeting laser beam is obstructed from intersecting the target point, according to an exemplary embodiment.

FIG. 44 is a side view of the remote of FIG. 11 coupled to a user's belt, according to an exemplary embodiment.

FIG. 45 is a side view of the remote of FIG. 15 coupled to a user's belt, according to an exemplary embodiment.

FIG. 46 is a front view of the remote of FIG. 15 coupled to a lanyard coupled to a user, according to an exemplary embodiment.

FIG. 47 is a side view of the remote of FIG. 15 coupled to a helmet, according to an exemplary embodiment.

FIG. 48 is a side view of the remote of FIG. 15 coupled to a strap coupled to the arm of a user, according to an exemplary embodiment.

FIG. 49 is a top view of the remote of FIG. 11 coupled to a platform, such as a moving platform, according to an exemplary embodiment.

FIG. 50 is a side view of the remote of FIG. 11 coupled to a ladder, according to an exemplary embodiment.

DETAILED DESCRIPTION

Figure 1:
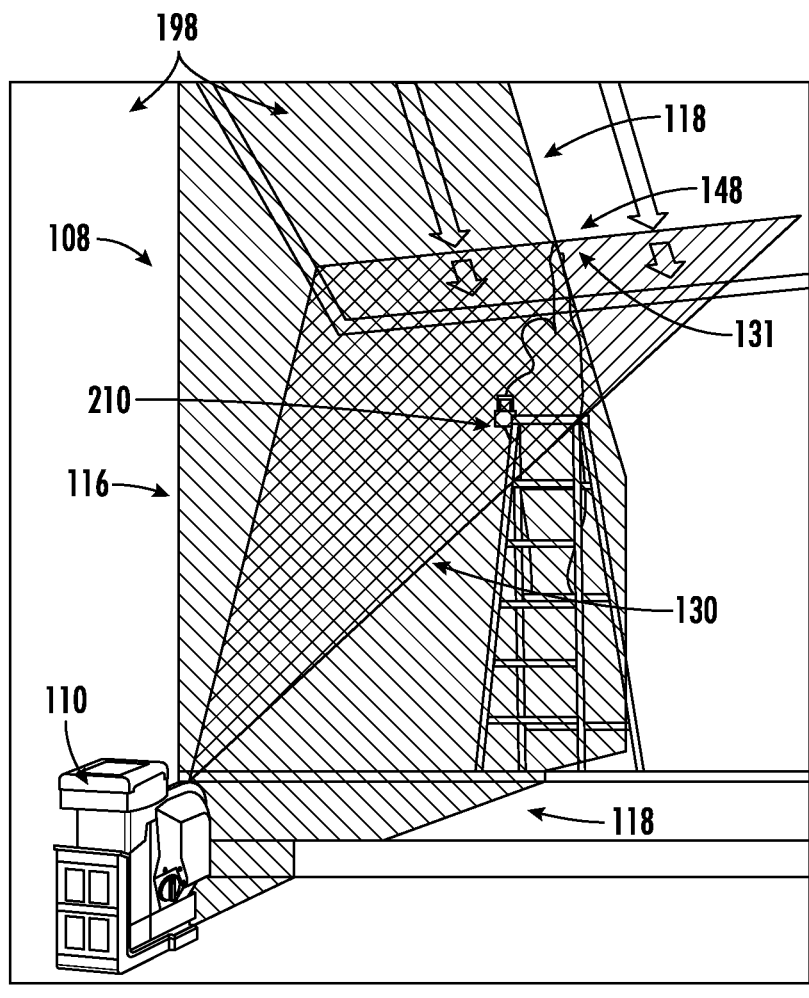
FIG. 1 is a perspective view of a laser system, according to an exemplary embodiment.
Figure 2:
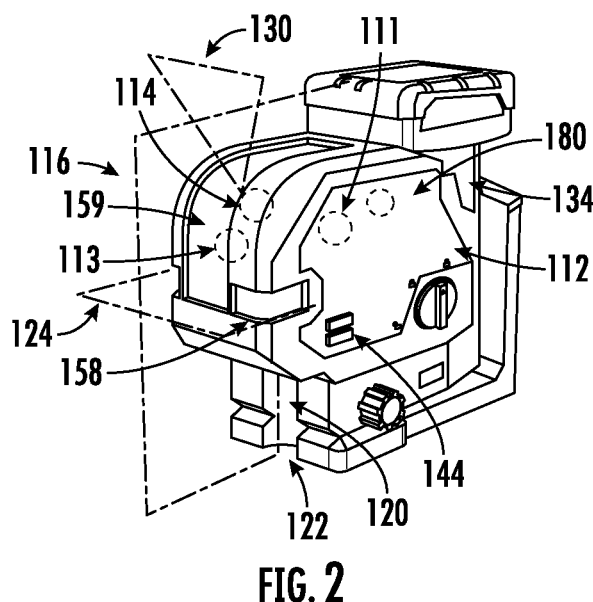
FIG. 2 is a perspective view of a laser level of the laser system of FIG. 1, according to an exemplary embodiment.

Referring generally to the figures, a laser level is provided, such as a point line and plane laser level. As will generally be understood, laser level systems, including laser emitters and remote controls, are used to align objects or features in an area (e.g., such as holes along a wall, pipe, conduit, etc.).

In various embodiments, the laser level described herein is configured to emit a laser beam at a series of target points identified by the user. For example, when the user wants to install a series of support structures hanging from a ceiling, the laser level receives information identifying the location of the series of target points. The laser level than selectively projects a targeting laser beam at the target point selected by the user. The user can toggle the targeting laser beam between target point, and perform fine adjustments of the targeting laser beam between target points. Various laser levels described herein provide this functionality while only having a single laser beam that is moved (e.g., not counting the laser beam used by a distance measuring device), thereby permitting the laser levels to have a small form factor and/or housing compared to more comprehensive systems that provide other functionality. Various laser levels described herein have an emission platform that is self-leveled, such as via a pendulum, and all of the laser emitters are supported on the self-leveling platform.

Various laser levels described herein detect an obstruction that is interrupting a path of the targeting laser beam. In response to detecting the obstruction, the laser level can signal the user of the obstruction, and the user can adjust the aim of the targeting laser beam to avoid the obstruction.

Referring to FIGS. 1-7, various aspects of a laser system 108 including a laser generating assembly and/or a laser beam generating device, shown as laser level 110, and a remote 210, are shown. Laser level 110 includes housing 134, one or more laser generators, shown as laser diode(s) 158, configured to emit one or more laser beams from laser level 110 (e.g., first output laser beam of light 116, laser beam plane of light 124, plumb laser beam 120, and/or targeting laser beam of light 130). The user controls the laser level 110 via a remote 210, such as wirelessly controlling the laser level 110.

In various embodiments, laser level 110 includes housing 112, a first laser generation device 113 coupled to the housing 112, a second laser generation device 114 coupled to the housing 112, and a controller 111 coupled to housing 112. In various embodiments, laser generation device 113 is configured to generate a first output laser beam of light 116 along a first plane, the first output laser beam of light 116 intersecting an upper surface (e.g., ceiling 198) above the housing 112 to form a line of light 118 on the upper surface (e.g., ceiling 198) that extends away from the housing 112. In various embodiments, laser generation device 114 is configured to generate a targeting laser beam of light 130, the targeting laser beam of light 130 projected at the upper surface (e.g., ceiling 198) at a first target 170 intersecting the line of light 118.

Laser level 110 emits a first output laser beam of light 116 emitted forward from laser level 110 that generates a line of light 118 on the one or more surfaces (e.g., ceiling 198), the line of light 118 extending away from above the laser level 110. Laser level 110 also emits a plumb laser beam 120 vertically downward from housing 134 that generates a lower point 122 on the one or more surfaces (e.g., a lower surface, such as a floor below the laser level 110). Laser level 110 emits a laser beam plane of light 124, such as horizontally and forward from housing 134, that generates a line on the one or more surfaces (e.g., walls in front of and/or to the side of laser level 110) that is horizontal.

In various embodiments, laser level 110 includes a leveling system 156, that auto-levels laser level 110 (e.g., by leveling housing 134), such as via a plum vial and/or an accelerometer. Laser level 110 includes one or more input buttons 144 that control laser level 110 (e.g., receive inputs that identify a series of points to be installed, change mode of operation). In various embodiments, laser diode(s) 158 include one or both of first laser generation device 113 and a second laser generation device 114. For example, laser level 110 includes a pendulum system that orients each of the laser diode(s) 158. In a specific embodiment, the one or more laser diodes 158 are supported on a self-leveling platform, such as via a pendulum (e.g., all of the laser diodes 158 on the laser level 110 are supported on the self-leveling pendulum).

In a specific embodiment, laser level 110 only includes laser diode(s) 158 that emit first output laser beam of light 116 and targeting laser beam of light 130. In a specific embodiment, laser diode(s) 158 only emit first output laser beam of light 116, laser beam plane of light 124, and targeting laser beam of light 130. In a specific embodiment, laser diode(s) 158 only emit first output laser beam of light 116, laser beam plane of light 124, plumb laser beam 120, and targeting laser beam of light 130. In a specific embodiment, only one laser beam emitted by the laser level 110 is moved relative to the body of the laser level 110 (not counting a laser beam emitted by the laser distance measurer 180).

Laser level 110 also emits a targeting laser beam of light 130 that identifies the target selected by the user for installation. As will be explained, users can toggle which point, along a run of points, that the laser level 110 will be identifying. Laser level 110 also includes a distance measuring device, shown as laser distance measurer 180, that measures the distance along which the targeting laser beam of light 130 is being projected.

In various embodiments, controller 111 is configured to receive a first information signal (e.g., signal 204) from laser distance measurer 180, the first information signal indicating a vertical distance (e.g., distance 196 in FIG. 20) of the upper surface (e.g., ceiling 198) above the laser distance measurer 180. In various embodiments, the laser distance measurer 180 measuring lateral distance 209 is based at least in part on the vertical distance 196 (e.g., by knowing vertical distance 196 and the distance of the hypotenuse, i.e., targeting laser beam of light 130, the controller 111 can calculate the horizontal distance). After the horizontal distance of that targeting laser beam of light 130 is projecting is calculated, laser level 110 can determine if there is an obstructions, such as if targeting laser beam of light 130 is projecting a horizontal distance less than is expected, then laser level 110 may determine there is an obstructing surface that targeting laser beam of light 130 is projecting onto.

Stated another way, laser distance measurer 180 is configured to measure a distance from the laser level 110 to an upper surface of the one or more surfaces above the laser level 110. The controller 111 is configured to receive a first information signal from the laser distance measurer 180, the first information signal indicating a distance to the upper surface above the laser level 110, with the line of light 118 being generated at least in part on the upper surface.

Figure 8:
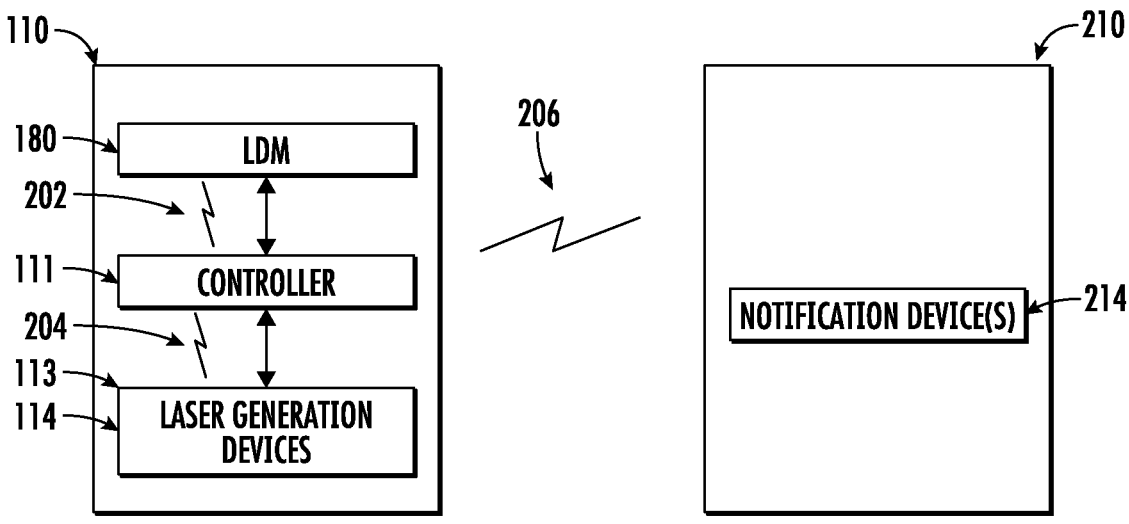
FIG. 8 is a schematic view of the laser level of FIG. 1 and a remote of the laser system of FIG. 1, according to an exemplary embodiment.

Referring to FIG. 8, provided is a schematic of laser level 110. Laser level includes laser distance measurer 180, controller 111, and laser generation devices 113, 114. Signal 202 is generated and communicated between laser distance measurer 180 and controller 111 (e.g., from laser distance measurer 180 to controller 111, and/or from controller 111 to laser distance measurer 180). Signal 204 is generated and communicated between controller 111 and laser generation devices 113, 114 (e.g., from controller 111 to laser generation devices 113, 114, and/or from laser generation devices 113, 114 to controller 111). Signal 206 is generated and communicated between laser level 110 and remote 210 (e.g., from laser level 110 to remote 210, and/or from remote 210 to laser level 110).

In various embodiments, controller 111 is configured to receive a first signal (e.g., signal 202) indicating that the targeting laser beam of light (e.g., targeting laser beam of light 130) is intersecting a third surface, such as an obstructing surface distinct from ceiling 198 (e.g., see FIG. 25), at a first location (e.g., projected target 171). In various embodiments, laser distance measurer 180 is coupled to housing 112, and laser distance measurer 180 is configured to measure lateral distance 209 of targeting laser beam of light 130 intersecting a surface (e.g., third surface 169 shown in FIG. 26, distinct from the surface of ceiling 198) and generate the first signal (e.g., signal 202 in FIG. 8) that includes the second lateral distance 209.

In some situations, the first target (e.g., target 170) is a non-zero first lateral distance 208 (FIG. 26) from the housing 112 and projected target 171 is a non-zero second lateral distance 209 (FIG. 26) from the housing 112 that is less than the first lateral distance 208. In various embodiments, controller 111 is configured to calculate a difference between the first lateral distance 208 and the second lateral distance 209, generate a second signal (e.g., signal 206) indicating the difference, and transmit the second signal to a remote device (e.g., remote 210) configured to receive the second signal and provide an indication to a user that identifies the difference. In various embodiments, the indication to the user provided by remote 210 is selected from the group consisting of an audio alert, a visual warning message, and a haptic signal.

In various embodiments, controller 111 receives a signal to adjust the targeting laser beam of light 130 slightly away from the target. For example, controller 111 is configured to receive a control signal (e.g., signal 206 from remote 210) to adjust the targeting laser beam of light, and in response to receiving the control signal, adjusting the aim of the targeting laser beam of light (e.g., targeting laser beam of light 130) a first adjustment distance (e.g., adjustment distance 176 in FIG. 4) from the first target (e.g., target 171) such that the targeting laser beam of light 130 intersects the line of light 118 at a location the first adjustment distance 176 from the first target 171.

In various embodiments, controller 111 receives a signal to aim at a different target. For example, controller 111 receives a control signal (e.g., signal 206 from remote 210) that instructs the second laser generation device 114 to adjust the aim of the targeting laser beam of light 130 such that the targeting laser beam of light 130 intersects the line of light 118 at a second target (e.g., target 363 in FIG. 3) of a plurality of targets (e.g., plurality of targets 360 in FIG. 3) that is distinct from the first target (e.g., target 361), and the plurality of targets 360 includes the first target 361.

Targeting laser beam of light 130 forms a target image 131 on the surface, the target image 131 intersecting the line of light 118 at the selected target. As will be explained, laser level 110 is configured to emit one or more types of target images 131, such as a target line, a target dot, a target X, and/or a target circle and dot (see FIGS. 16-19).

Laser level 110 includes a controller 111 that controls various aspects of laser level 110. In various embodiments, controller 111 is configured to receive information identifying a plurality of targets (e.g., plurality of targets 360), receive a first control signal to emit the targeting laser beam of light 130 at a first target (e.g., first target 361, referring to as actual target 170 in some use cases described herein) of the plurality of targets 360, and in response to receiving the first control signal, adjusting the targeting laser beam of light 130 such that the target image 131 is projected to intersect the line of light 118 at the first target. In various embodiments, controller 111 of laser level 110 receives a signal (e.g., signal 206) from remote device 210 that identifies plurality of targets 360 that includes the first target 361.

In various embodiments, laser level 110 includes a window 159 through which targeting laser beam of light 130 projects, and window 159 is curved and centered on targeting laser beam of light 130 so that refraction through the window is constant as targeting laser beam of light 130 is adjusted. Alternatively, window 159 is not centered on targeting laser beam of light 130 (e.g., window 159 is flat) and the system accounts for the deflection of targeting laser beam of light 130 through different parts of window 159 as targeting laser beam of light 130 is adjusted. In various embodiments, laser level 110 includes wireless communications, such as infrared, within laser level 110 (e.g., between the housing and a pendulum) to reduce internal wiring.

Figure 3:
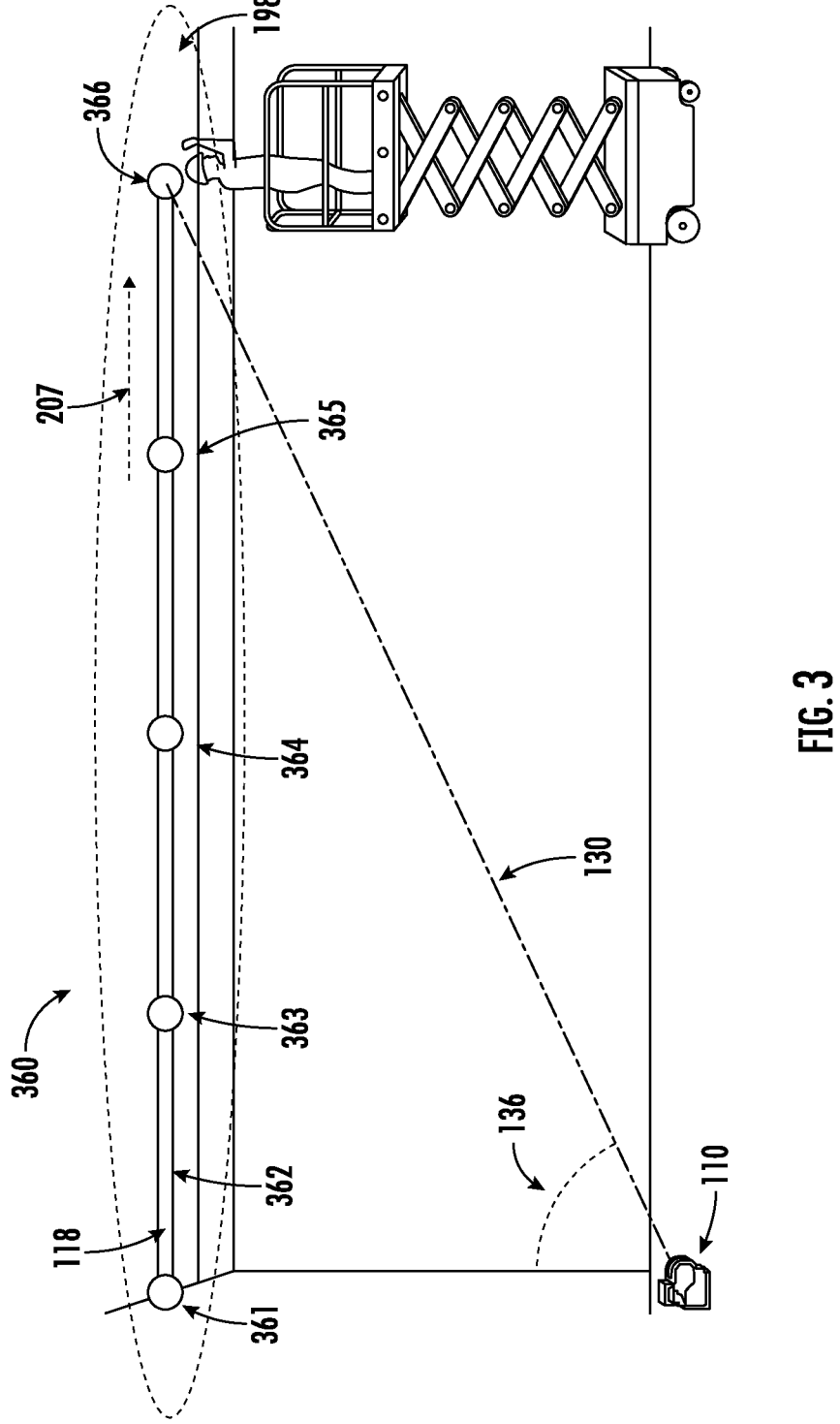
FIG. 3 is a side view of the laser system of FIG. 1 in use, according to an exemplary embodiment.

For example and referring to FIG. 3, a user plans to install a series of point along plurality of targets 360. The plurality of targets 360 includes first target 361, second target 363, third target 364, fourth target 365, and fifth target 366. First target 361 and second target 363 are separated by interval 362. In various situations, each of the points on plurality of targets 360 are separated from their neighboring points by interval 362. Alternatively and as will be explained, runs of points may be separated by different arrangements of intervals (e.g., alternating, a series of first intervals followed by a series of second intervals, etc.). As targeting laser beam of light 130 is adjusted (e.g., in direction 207), angle 136 of targeting laser beam of light 130 with respect to vertical changes. As will be described, in various embodiments laser level 110 sometimes uses angle 136 to make determinations regarding the aim of targeting laser beam of light 130.

Figures 4, 5, 6, 7:
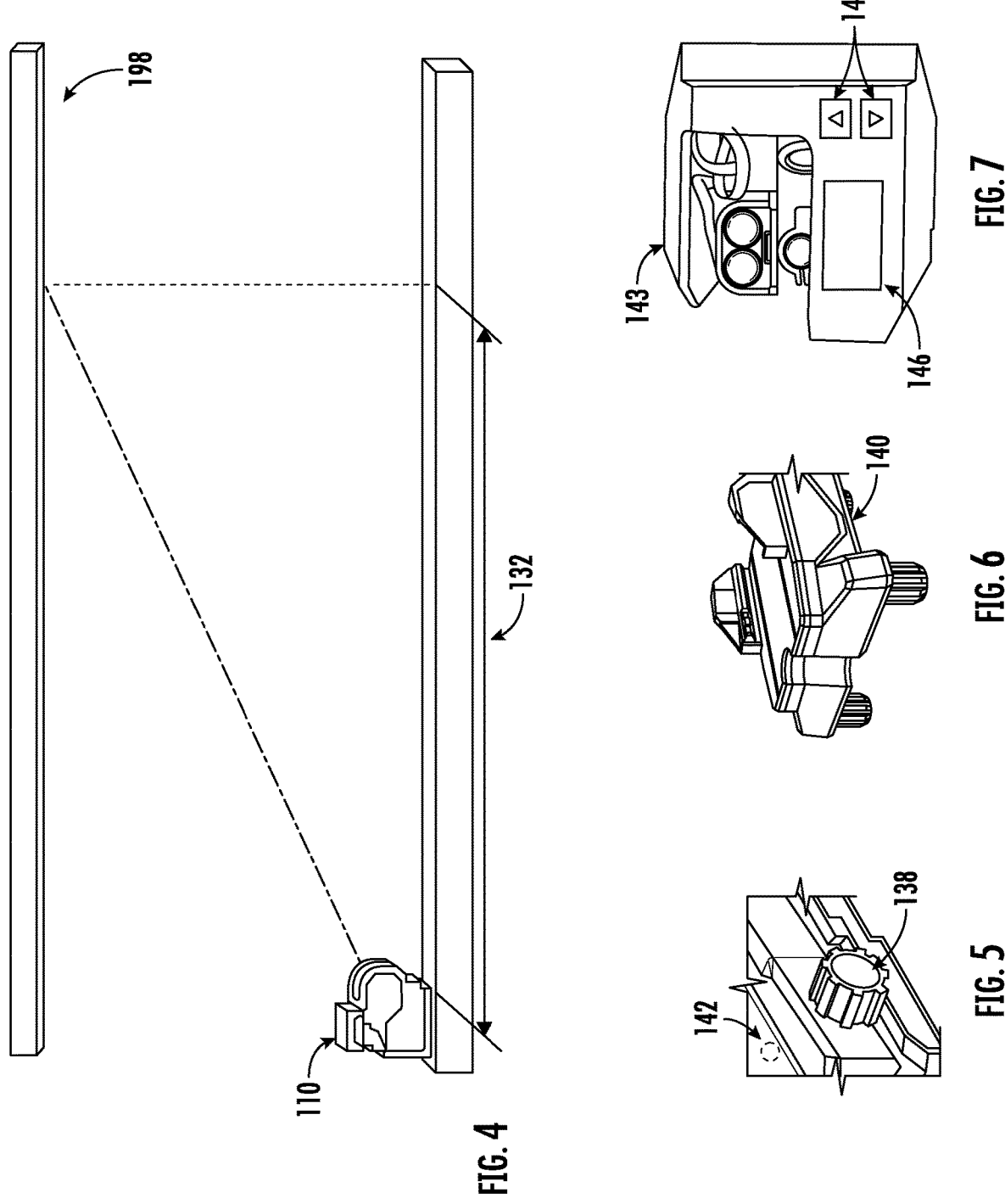
FIG. 4 is a side view of the laser level of FIG. 2, according to an exemplary embodiment.
FIG. 5 is a detailed perspective view of the laser level of FIG. 2, according to an exemplary embodiment.
FIG. 6 is a detailed perspective view of a portion of the laser level of FIG. 2, according to an exemplary embodiment.
FIG. 7 is a detailed perspective view of another laser level of the laser system of FIG. 1, according to another exemplary embodiment.

Referring to FIG. 4, laser level 110 is configured to emit targeting laser beam of light 130 distance 132, such as at least 50 feet. Referring to FIG. 5, in various embodiments laser level 110 includes micro-adjust 138 to perform small adjustments to laser level 110 and/or auto-align 142 to automatically align one or more laser beams emitted from laser level 110. Referring to FIG. 6, in various embodiments laser level 110 includes a motorized base 140 to move and/or reorient laser level 110, such as a motorized base 140 controllable by remote 210.

Referring to FIG. 7, laser level 143 is shown according to an exemplary embodiment. Laser level 143 is substantially the same as laser level 110 except for the differences discussed herein. Laser level 143 includes input buttons 145 to receive input, such as information indicating details of the series of points to be installed, and a screen 146 to provide feedback to the user, such as feedback relating to the information the user is providing. In various embodiments, laser level 110 also includes a screen similar to screen 146.

Figures 9, 10:
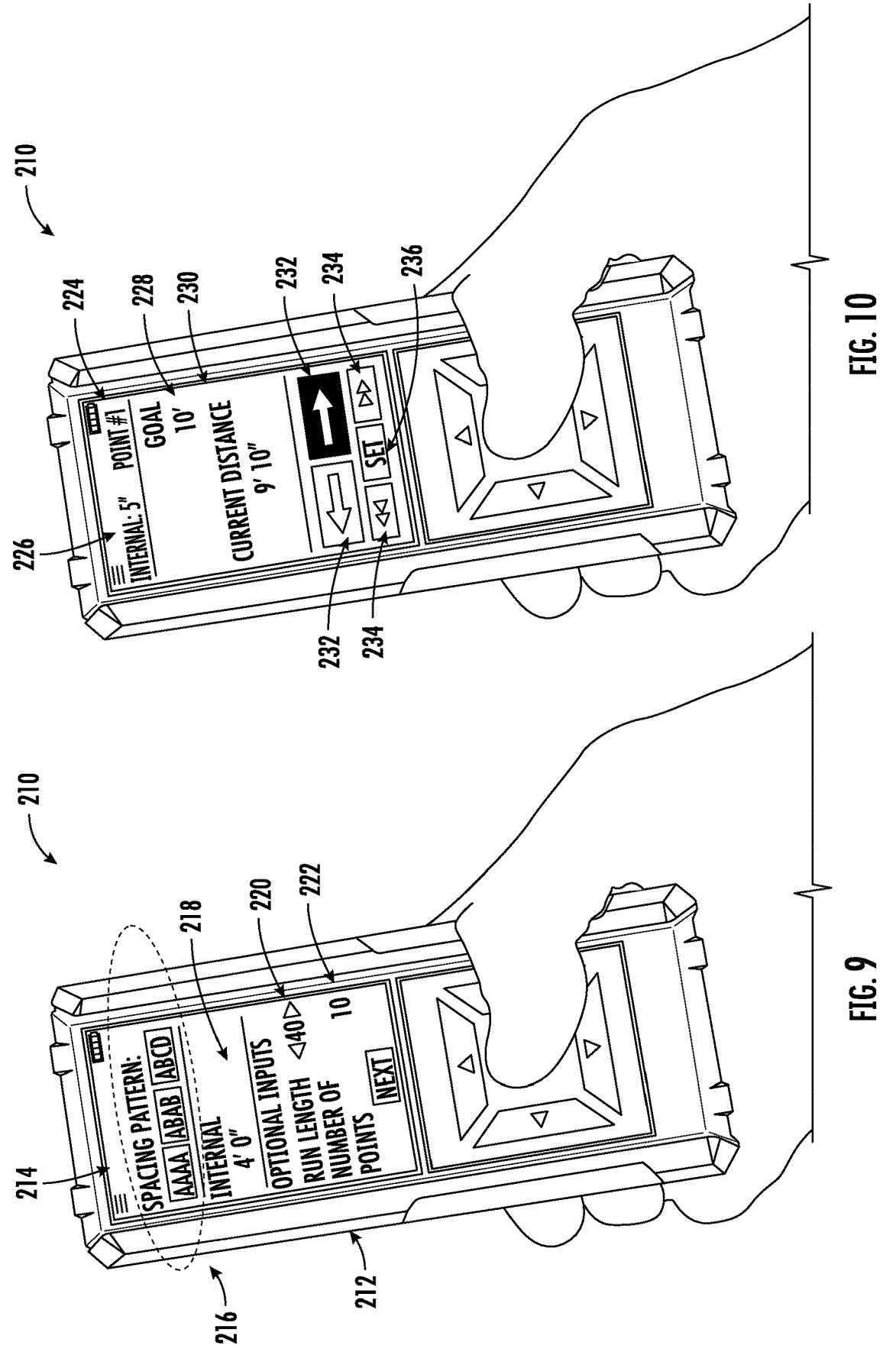
FIG. 9 is a front view of the remote of FIG. 8 of the laser system of FIG. 1, according to an exemplary embodiment.
FIG. 10 is a front view of the remote of FIG. 8, according to an exemplary embodiment.
Figure 12:
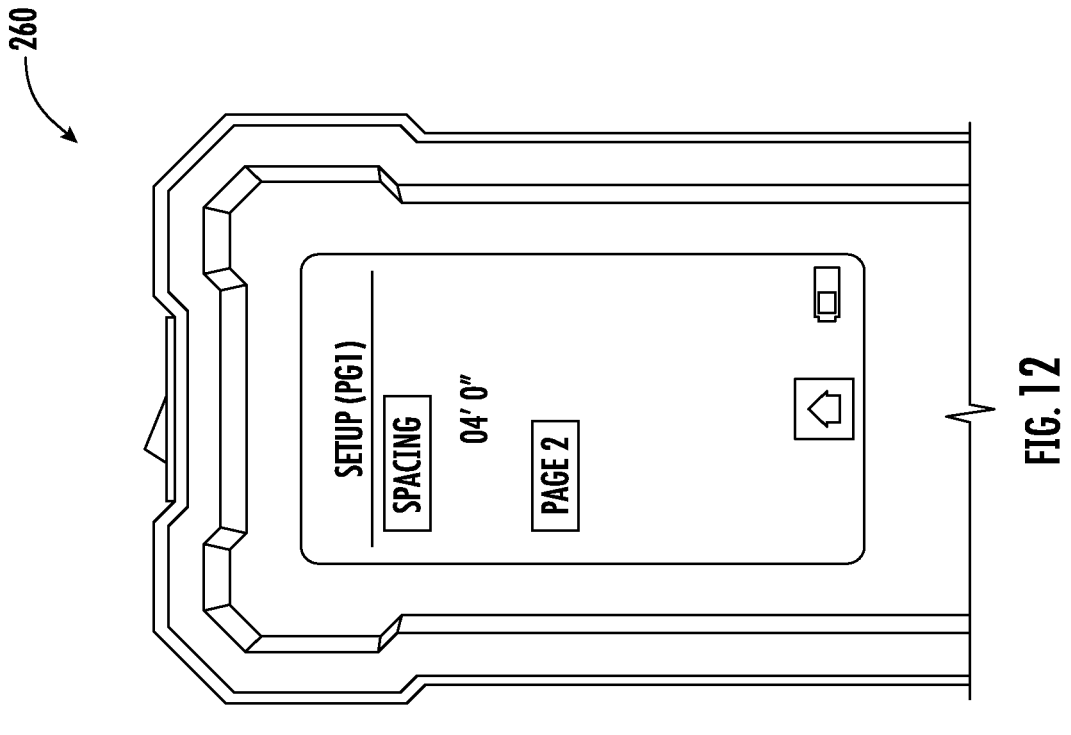
FIG. 12 is a front view of the remote of FIG. 11, according to an exemplary embodiment.
Figure 11:
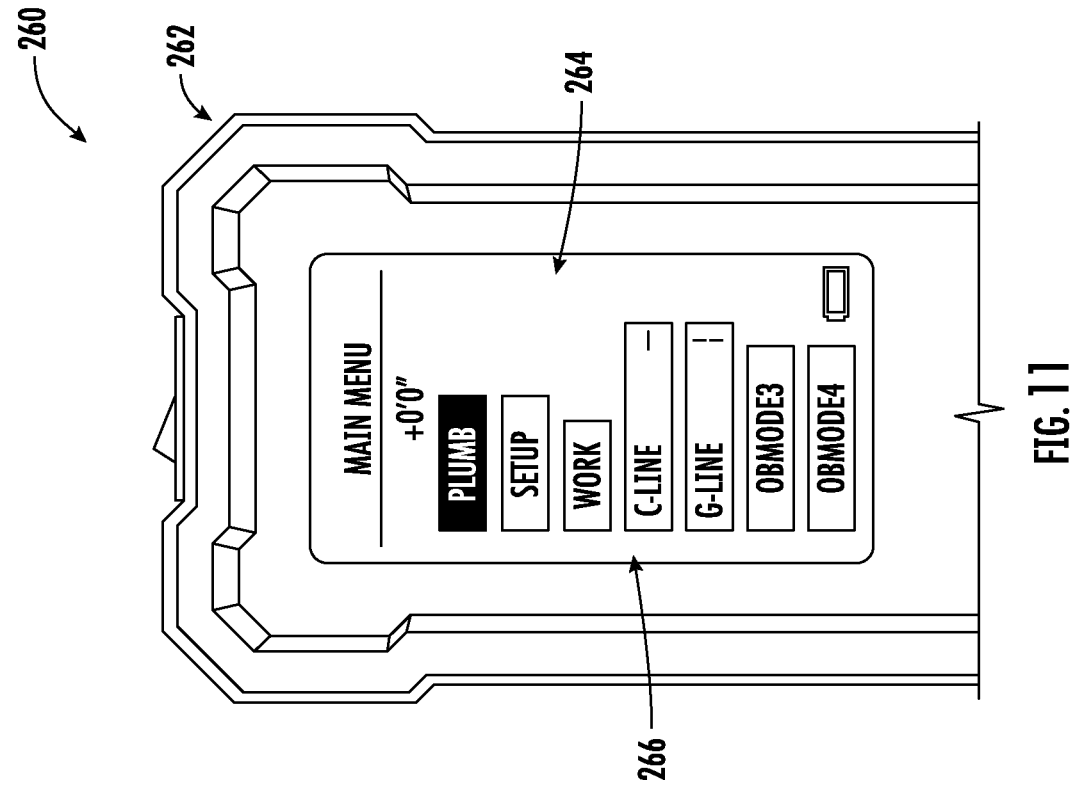
FIG. 11 is a front view of a remote of the laser system of FIG. 1, according to another exemplary embodiment.

Referring to FIGS. 9-10, various aspects of remote 210 are shown. Remote 210 is configured to control, such as wirelessly control, laser levels within laser system 108, such as laser level 110. In various embodiments, remote 210 is configured to control the first laser generation device 113 and the second laser generation device 114. In various embodiments, remote 210 is configured to control the second laser generation device 114. Remote 210 includes housing 212 and a screen 214 coupled to housing 212.

Referring to FIG. 9, various aspects of screen 214 are shown while the user is configuring a run, such as plurality of targets 360. In various embodiments, screen 214 displays options for selecting an interval pattern 216. As a first example ("AAAA"), the selected interval pattern 216 is that each interval is the same distance. As a second example ("ABAB"), the selected interval pattern 216 is that the interval distance alternates between two distances so the odd intervals (i.e., $1^{st}$, $3^{rd}$, $5^{th}$, etc.) are the first distance A and the even intervals (i.e., $2^{nd}$, $4^{th}$, $6^{th}$, etc.) are the second distance B that is different than distance A. As a third example ("ABCD"), the selected interval pattern 216 is that each interval is unique with respect to the other intervals. The screen 214 also displays the selected interval distance 218, which in this case is four feet, a run length 220 indicating the total length of the run, which in this case is 40 feet, and/or the number 222 of points, which in this case is 10 points.

In various embodiments, laser level 110 is configured to receive any two of interval distance 218, run length 220, and number 222 of points, and laser level 110 calculates and displays the remaining piece of data. For example, the user inputs the interval length and the total run length, the laser level 110 calculates the total number of points.

Referring to FIG. 10, various aspects of screen 214 are shown as the user is installing points along a run. For example, in various embodiments screen 214 displays the interval distance 226, the point number 224 being installed (e.g., the Pt point along the run), the goal distance 228 for the point number 224, and the current distance 230 that targeting laser beam of light 130 is projecting target image 131. As will be explained, goal distance 228 and current distance 230 may be different numbers when the targeting laser beam is hitting an obstruction or is adjusted in response to an obstruction.

Remote 210 includes buttons 232 that adjust which point along the run is being currently targeted. Remote 210 also includes buttons 234 that perform fine adjustments to the targeting laser beam of light 130, such as in response to an obstruction. The buttons 234 that perform fine adjustments are configured to adjust the aim of targeting laser beam of light 130 to move slowly (e.g., one inch per second).

In various embodiments, the laser level 110 is configured to move the targeting laser beam of light 130 such that targeting laser beam of light 130 moves a constant speed across the ceiling. For example, when targeting laser beam of light 130 is aimed a far horizontal distance (e.g., 50 feet), very small adjustments to the angle 136 of targeting laser beam of light 130 will result in much larger movements of targeting line 148 compared to when targeting laser beam of light 130 is aimed much closer to laser level 110. So the user does not have to consider these geometric questions when adjusting targeting laser beam of light 130, laser level 110 calculates the speed at which to change the angle 136 so that the target image 131 produced by targeting laser beam of light 130 (e.g., targeting line 148) moves at a constant speed across the ceiling independent of the size of angle 136 (i.e., no matter how big or small the horizontal distance between targeting line 148 and laser level 110).

For example, laser level 110 (e.g., controller 111) receives a control signal that instructs the second laser generation device 114 to adjust the aim of the targeting laser beam of light 130 so that the targeting laser beam of light 130 intersects the upper surface (e.g., ceiling 198) at an intersecting location that moves linearly along the line of light 118 at a constant speed with respect to the upper surface (e.g., ceiling 198).

As another example, laser level 110 may initially adjust targeting laser beam of light 130 at first speed and later at a second speed that is faster, thereby helping make faster adjustments. In particular, laser level 110 (e.g., controller 111) may receive a control signal that instructs the second laser generation device 114 to initially adjust the aim of the targeting laser beam of light 130 so that the targeting laser beam of light 130 intersects the upper surface (e.g., ceiling 198) at an intersecting location that moves linearly along the line of light 118 at a first speed with respect to the upper surface for a first length of time (e.g., 2 seconds), and subsequent to the first length of time at a second speed with respect to the upper surface that is greater than the first speed.

Remote 210 also includes a set button 236. As will be explained, after fine adjustments have been performed for a selected target, the set button 236 reconfigures the distance to subsequent points along the run in response to any fine adjustments that have been made.

In various embodiments, controller 111 is configured to receive a second control signal to adjust the targeting laser beam of light 130 from the first target 361, and in response to receiving the second control signal, adjusting the targeting laser beam of light 130 a first adjustment distance (e.g., first adjustment distance 176 in FIG. 42) such that the target image 131 intersects the line of light 118 at a location the first adjustment distance from the first target 361. In various embodiments, the second control signal instructs the laser level 110 to move the targeting laser beam of light 130 such that the target image 131 intersects the first line of light 118 at a second target 363 of the plurality of targets 360 that is distinct from the first target 361.

In various embodiments, the second control signal instructs the laser level 110 to move the target image 131 linearly along the first line of light 118 at a constant speed (e.g., one inch per second). In various embodiments, the second control signal instructs the laser level 110 to initially move the target image 131 linearly along the first line of light 118 at a first speed (e.g., one inch per second) for a threshold period of time (e.g., three seconds), and subsequent to the threshold period of time at a second speed greater (e.g., 1.5 inches per second) than the first speed.

In various embodiments, the controller 111 is configured to receive a third control signal (e.g., the user pressing set button 236) to reset each of the targets in the plurality of targets 360 in the target series subsequent to the selected target (e.g., first target 361), and, in response to receiving a signal, such as the third control signal, the controller 111 is further configured to adjust each target in the plurality of targets subsequent to the selected target (e.g., first target 361) by the first adjustment distance (e.g., first adjustment distance 176).

In one exemplary use, the user is working on a run that includes points at 0', 10', 20', and 30'. The user installs at 0' and then when installing at the 10' the user discovers a pipe in the way. The user then makes fine adjustments to the laser, such as shortening the aim by two inches so the laser is now pointing at 9' 10". After installing the point at 9' 10", one option is for the user to continue installing at the predetermined points (e.g., at 20' and 30'). Another option is for the user to press the set button 236, and subsequent points are adjusted in response to the fine adjustments performed by the user. In particular, after pressing the set button 236 the subsequent points for installation would become 19' 10" and 29' 10" (e.g., all of the subsequent points are now adjusted in a similar direction and distance that the user adjusted the first point in response to the obstruction).

Referring to FIGS. 11-14, remote 260 is shown according to an exemplary embodiment. Remote 260 is substantially the same as remote 210 except for the differences discussed herein. Remote 260 includes housing 262, screen 264, interface 266 displaying options for the user to select, and buttons 268 for the user to make selections and give instructions.

In various embodiments, remote 210, remote 260 and/or remote 280 are configured to be dropped from height (e.g., up to 10', or more specifically up to 16', or even more specifically up to 38') and withstand no or minimal permanent damage. Thus, the remotes can be used by workers at height on lifts (e.g., scissor lifts).

Figures 13, 14, 15:
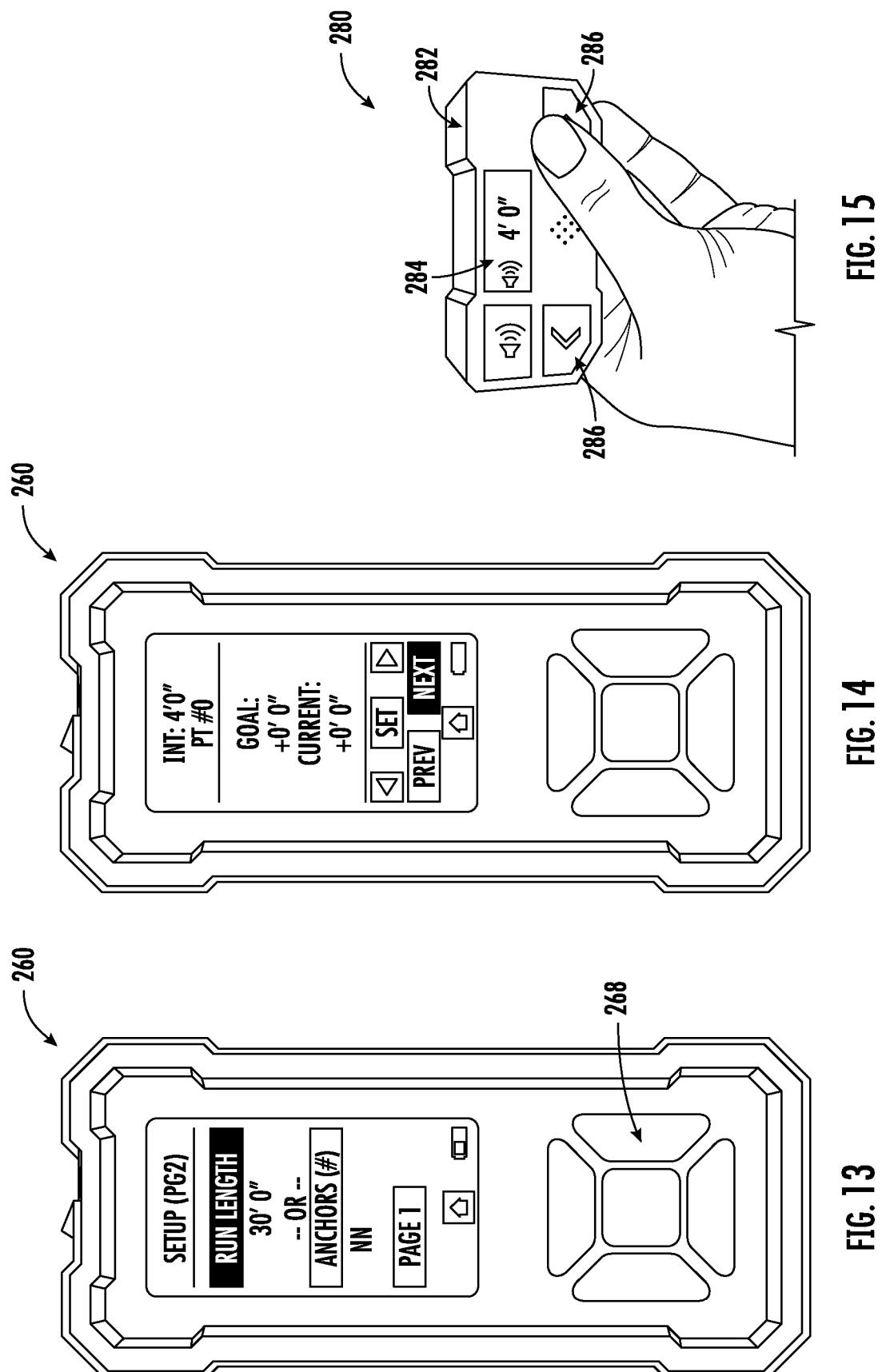
FIG. 13 is a front view of the remote of FIG. 11, according to an exemplary embodiment.
FIG. 14 is a front view of the remote of FIG. 11, according to an exemplary embodiment.
FIG. 15 is a front view of a remote of the laser system of FIG. 1, according to another exemplary embodiment.

Referring to FIG. 15, remote 280 is shown according to an exemplary embodiment. Remote 280 is substantially the same as remote 210 or remote 260 except for the differences discussed herein. In particular, remote 280 is smaller than remote 260 and remote 210. Remote 280 includes housing 282, screen 284, and buttons 286 for the user to make selections and give instructions. In various embodiments, when a user taps a button 286 (e.g., quickly presses and releases) the laser level 110 moves to the next or previous target in the run, depending on whether the left or right button was pressed. Alternatively, if the user holds a button 286 then fine adjustment is initiated and the laser level 110 moves the resultant target produced by targeting laser beam of light 130 (e.g., targeting line 148) at a slow speed across the ceiling (e.g., one inch per second). In various embodiments, as the user continues to hold the button 286 the speed of the targeting line 148 slowly increases (e.g., from one inch per second for the first three seconds to 1.5 inches per second for the next second, to 2 inches per second for the subsequent second).

Figures 16, 17, 18, 19:
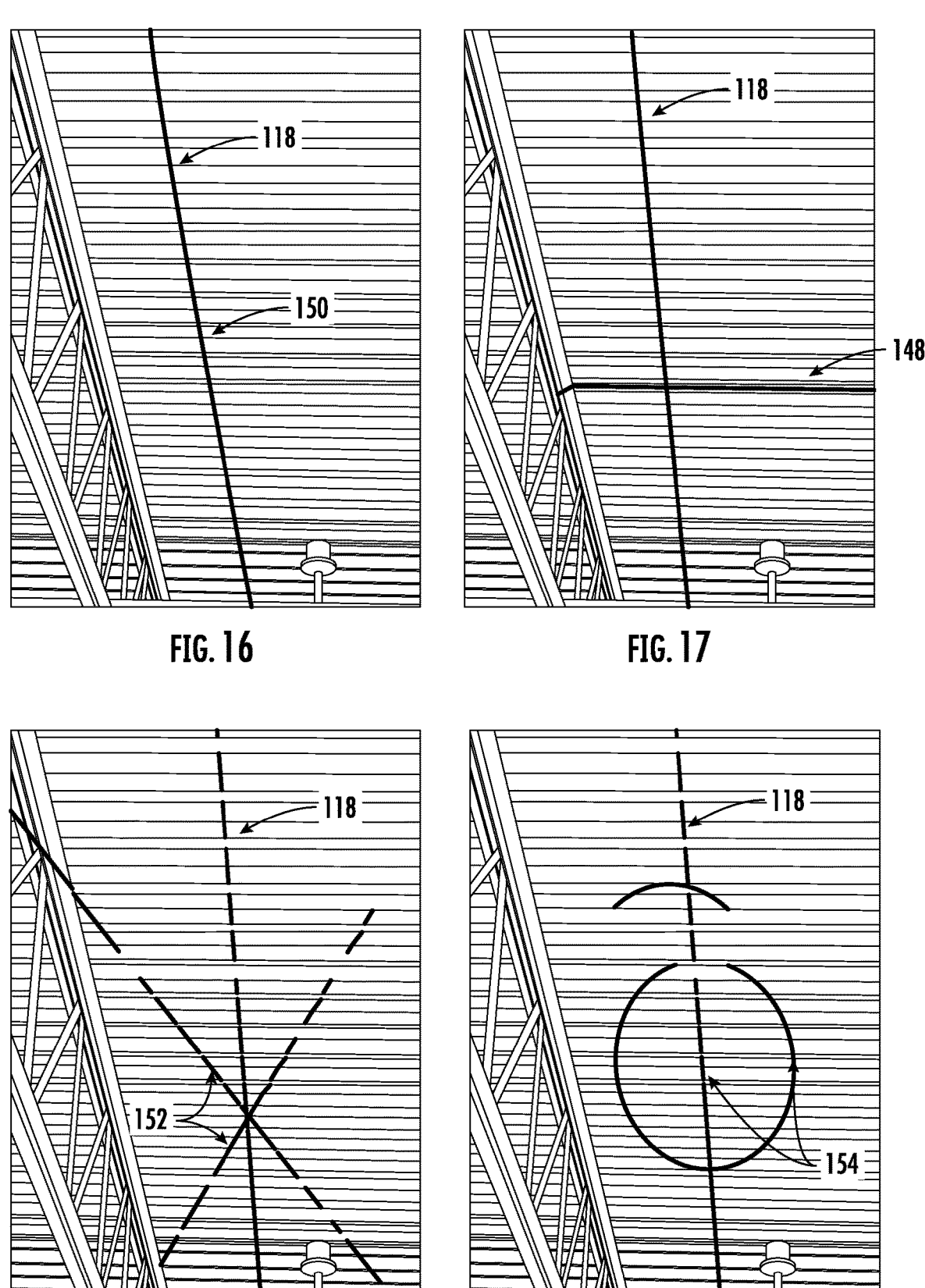
FIG. 16 is a perspective view from below of laser beam(s) emitted by the laser system of FIG. 1, according to an exemplary embodiment.
FIG. 17 is a perspective view from below of laser beam(s) emitted by the laser system of FIG. 1, according to an exemplary embodiment.
FIG. 18 is a perspective view from below of laser beam(s) emitted by the laser system of FIG. 1, according to an exemplary embodiment.
FIG. 19 is a perspective view from below of laser beam(s) emitted by the laser system of FIG. 1, according to an exemplary embodiment.

Referring to FIGS. 16-19, laser level 110 is configured to emit one or more types of targeting laser beams of light 130 to generate the targeting indication along line of light 118. Referring to FIG. 16, targeting laser beam of light 130 generates a targeting dot 150 at the selected point for installation. Referring to FIG. 17, targeting laser beam of light 130 generates a targeting line 148 at the selected point for installation. Referring to FIG. 18, targeting laser beam of light 130 generates a targeting X 152 at the selected point for installation. Referring to FIG. 19, targeting laser beam of light 130 generates a targeting circle and dot 154 at the selected point for installation.

Figure 20:
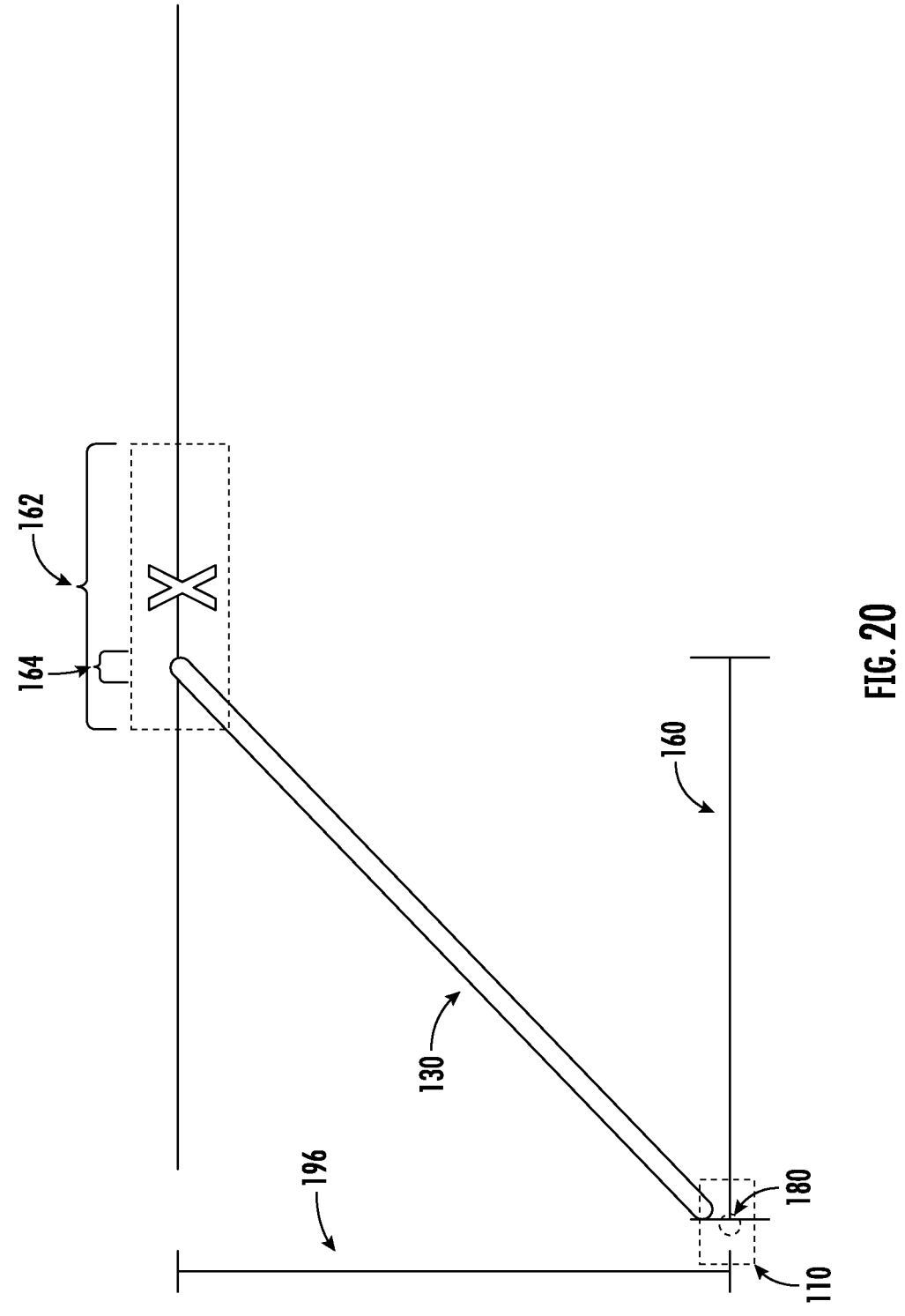
FIG. 20 is a schematic side view of laser beam(s) emitted by the laser system of FIG. 1, according to an exemplary embodiment.
Figure 21:
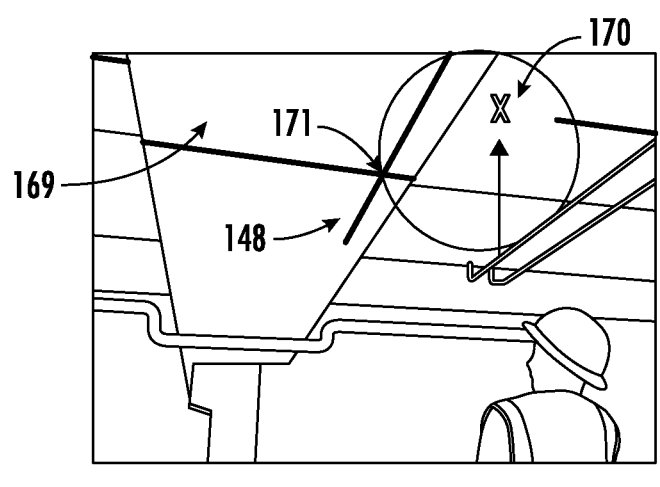
FIG. 21 is a perspective view from below and the side of laser beam(s) emitted by the laser system of FIG. 1, according to an exemplary embodiment.

Referring to FIG. 20, in various embodiments when targeting laser beam of light 130 is projected distance 160 (e.g., 50 feet), the targeting laser beam of light 130 has an accuracy 162 of generating the target point within 1" of the target and has a width 164 of 1". More specifically, the targeting laser beam of light 130 has an accuracy 162 of 0.5" and even more specifically of 0.25", and the width 164 of targeting laser beam of light 130 at 50' is 0.5". As shown, laser level 110 is distance 196 from the ceiling.

Figure 22:
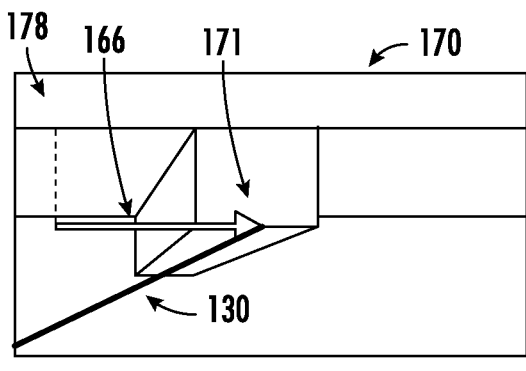
FIG. 22 is a schematic view of laser beam(s) emitted by the laser system of FIG. 1, according to an exemplary embodiment.
Figure 23:
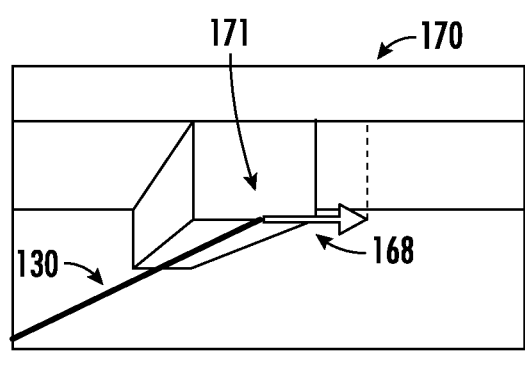
FIG. 23 is a schematic view of laser beam(s) emitted by the laser system of FIG. 1, according to an exemplary embodiment.

Referring to FIGS. 21-25, in various situations the targeting laser beam of light 130 is obstructed by an obstruction and as a result the targeting line 148 generated by targeting laser beam of light 130 is intersecting the actual target 170. Instead, targeting laser beam of light 130 projects an image at projected target 171, which is a non-zero distance from actual target 170. Referring to FIG. 22, when laser level 110 detects this situation, laser level 110 can communicate distance 166 from the previous target 178 to where targeting laser beam of light 130 is intersecting the obstruction at projected target 171. Referring to FIG. 23, when laser level 110 detects this situation, laser level 110 can communicate distance 168 from the actual target 170 to where targeting laser beam of light 130 is intersecting the obstruction at projected target 171.

Figure 24:
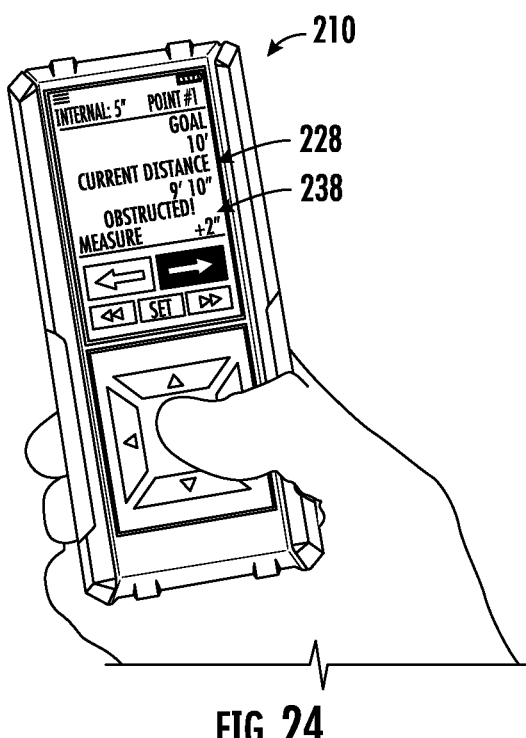
FIG. 24 is a front view of the remote of FIG. 8, according to an exemplary embodiment.
Figure 25:
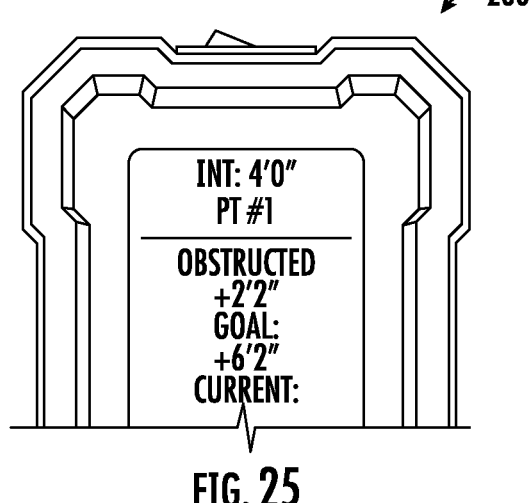
FIG. 25 is a front view of the remote of FIG. 11, according to an exemplary embodiment.

Referring to FIG. 24, in various embodiments in response to remote 210 detecting an obstruction, remote 210 displays an indication 238 (e.g., a warning message) on the screen, remote 210 generates an audio warning (e.g., an audible beep), and/or remote 210 blinks one or more laser beams (e.g., targeting laser beam of light 130). Referring to FIG. 25, remote 260 displays a warning message on the screen, remote 260 generates an audio warning (e.g., an audible beep), and/or remote 260 blinks one or more laser beams (e.g., targeting laser beam of light 130).

Figures 26, 27, 28, 29, 30:
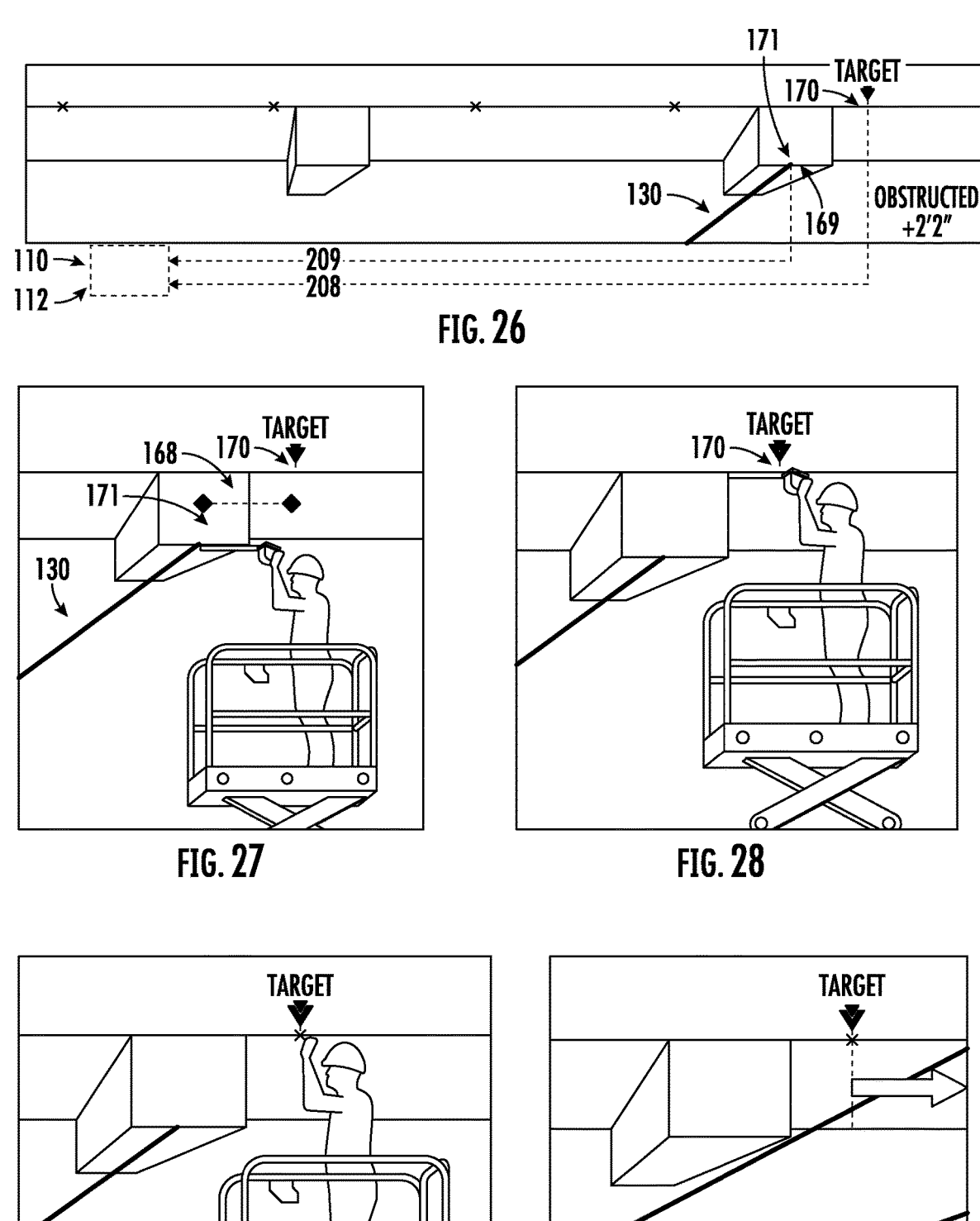
FIGS. 26-30 are a series of schematic side views for installing at a target point for which the targeting laser beam is obstructed from intersecting the target point, according to an exemplary embodiment.

Referring to FIGS. 26-30, an exemplary method of installing at a target point despite the obstruction is provided. Referring to FIG. 26, targeting laser beam of light 130 is obstructed by the obstruction, thereby preventing targeting laser beam of light 130 from intersecting actual target 170. Referring to FIGS. 27-28, user measures distance 168 from the intersection of targeting laser beam of light 130 and the obstruction at projected target 171, to the actual target 170. Referring to FIGS. 29-30, the user then performs the installation at actual target 170, and proceeds to the next installation target, if any.

Referring to FIGS. 31-35, an exemplary method of installing at a target point despite the obstruction is provided. Referring to FIG. 31, targeting laser beam of light 130 is obstructed by the obstruction, thereby preventing targeting laser beam of light 130 from intersecting actual target 170. Referring to FIG. 32, the user performs fine adjustments to targeting laser beam of light 130 until targeting laser beam of light 130 is no longer obstructed and points to an updated target 172. The user then refers to the remote (e.g., remote 210) to determine the amount of adjustment (e.g., see current distance 230 in FIG. 10) and measures backwards (FIG. 33). Referring to FIGS. 34-35, the user then performs the installation at actual target 170, and proceeds to the next installation target, if any.

Stated another way, controller 111 of laser level 110 is configured to receive a first signal to adjust the aim of the targeting laser beam of light 130 so the targeting laser beam of light 130 intersects the line of light 118 at a first alternate location, shown as updated target 172, calculate a non-zero lateral distance 176 between the first alternate location (e.g., updated target 172) and the first target 170, generate a second signal (e.g., signal 206 in FIG. 9) indicating the lateral distance 176, and transmit the second signal 206 to a remote device (e.g., remote device 210) configured to receive the second signal 206 and display an indication to a user that identifies the lateral distance (e.g., see FIG. 10). Alternatively, both distance 208 and distance 209 (see FIG. 25) are communicated from laser level 110 to remote 210.

Referring to FIGS. 36-39, an exemplary method of installing at a target point despite the obstruction is provided. Referring to FIG. 36, targeting laser beam of light 130 is obstructed by the obstruction, thereby preventing targeting laser beam of light 130 from intersecting actual target 170.

Referring to FIG. 37, user adjusts laser level 110 to point to the next target 174, and measures the interval distance from next target 174 to actual target 170. Referring to FIGS. 38-39, the user then performs the installation at actual target 170, and proceeds to the next installation target, if any.

Figures 40, 41, 42, 43:
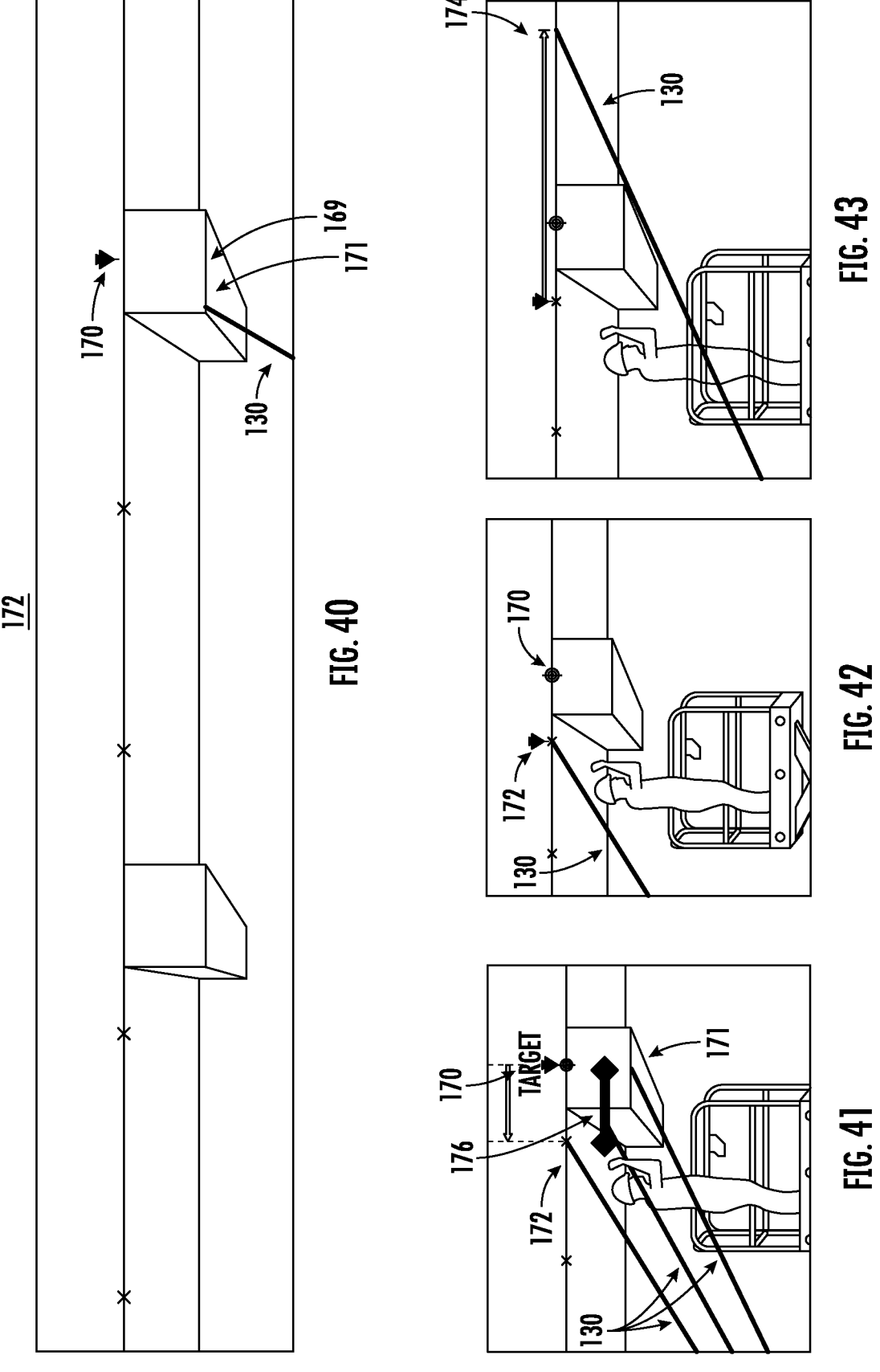
FIGS. 40-43 are a series of schematic side views for installing at a target point for which the targeting laser beam is obstructed from intersecting the target point, according to an exemplary embodiment.

Referring to FIGS. 40-43, an exemplary method of installing at a target point despite the obstruction is provided. Referring to FIG. 40, targeting laser beam of light 130 is obstructed by the obstruction, thereby preventing targeting laser beam of light 130 from intersecting actual target 170. Referring to FIG. 41, user adjusts targeting laser beam of light 130 to point to the updated target 172. Referring to FIGS. 42-43, the user then performs the installation at updated target 172, and proceeds to the next target 174.

Alternatively, in various embodiments the user selects a button (e.g., set button 236, see FIGS. 9-10 and accompanying description) to adjust each subsequent target in the plurality of targets 360 consistent with the adjustments made from actual target 170 to updated target 172. For example, if updated target 172 is moved distance X relative to actual target 170 (e.g., 5" closer to laser level 110), then each subsequent point in plurality of targets 360 (e.g., each target further from laser level 110 than actual target 170) is adjusted that same distance X (e.g., in this example, each subsequent point in plurality of targets 360 is moved 5" closer to laser level 110).

Referring to FIGS. 44-50, various methods of the user carrying and/or securing the remotes are shown. By way of providing examples, remote 260 may be coupled to a belt of a user (FIG. 44), remote 280 may be coupled to a belt of a user (FIG. 45), remote 280 may be coupled to a strap around a user, such as around a neck of the user (FIG. 46), remote 280 may be coupled to a helmet of a user (FIG. 47), remote 260 may be coupled to a strap coupled to a user, such as around an arm of the user (FIG. 48), remote 260 may be coupled to a platform, such as a movable platform (FIG. 49), and/or remote 260 may be coupled to a ladder (FIG. 50).

Figure 51:
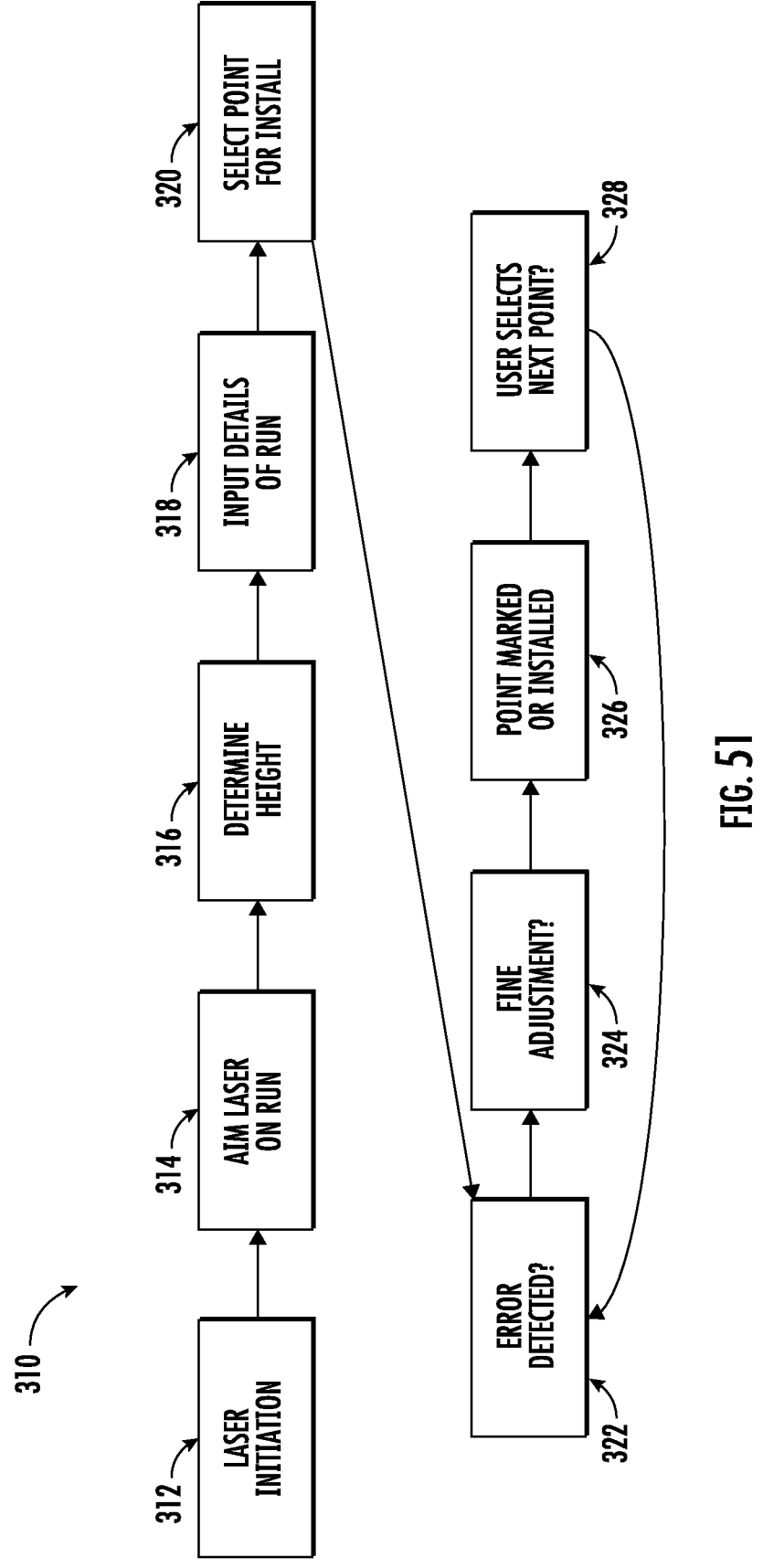
FIG. 51 is an exemplary method of using the laser system of FIG. 1, according to an exemplary embodiment.

Referring to FIG. 51, an exemplary method 310 of using laser system 108, such as laser system 108 including laser level 110, is provided. Starting at step 312, laser level 110 is initiated. In various embodiments, laser level 110 initiates leveling and homing processes. For example, one or more axes are leveled via using a gravity pendulum, and one or more axes are leveled via a motor.

At step 314, the user aims laser level 110. For example, laser level 110 is placed in a location such that the laser level 110 is below (or above) a selected location, such as a starting point in a room. In various embodiments, the user adjusts the micro-adjust 138 to perform minor adjustments to the position and/or aim of laser level 110. Laser level 110 is also aligned with the run, such as plurality of targets 360. For example, the user uses auto-align 142 and/or a motorized base 140 to orient and/or aim the laser level 110 along the plurality of targets 360.

At step 316, the laser level 110 measures a distance to the surface above, such as a ceiling 198. For example, laser distance measurer 180 measures the distance to ceiling 198. In various embodiments, the distance to the ceiling is measured after and in response to the leveling of laser level 110 being complete. In various embodiments, the laser level 110 stores a minimum height for operations to prevent blocking, and the laser level 110 further includes an option for the user to ignore the minimum height.

At step 318, the details of the run, such as plurality of targets 360, are input, such as via remote 210 or input buttons on laser level 110. In various embodiments, the user inputs details of the first run into a remote, such as remote

15

16

210. Referring to FIG. 9 and the associated paragraph(s), the user selects the selected interval pattern 216 (e.g., AAAA, AAAABBBB, ABAB, ABCABCABC, ABCD). Interval pattern 216 of "AAAA" uses the same interval between every targeting point on plurality of targets 360. Interval option AAABBBB uses a first interval distance for the first three intervals, and then a second interval distance different than the first distance for the next three or more intervals. Interval options ABABAB and ABCABCABC use repeating interval options. In particular, ABABAB alternates between two interval distances, and ABCABCABC rotates between three interval distances. Interval option ABCD uses a different interval distance for each interval, or at least a different interval distance for each of the first three intervals. In various embodiments, the remote stores and displays previous interval distances that have been used for easier selection by the user.

At step 320, the user selects a point for installation. For example, the user selects first target 361 on plurality of targets 360.

At step 322, laser level 110 determines whether any errors are detected. If an error is detected, laser level 110 may initiate an alert, such as an audio alert, a blinking light, a blinking laser, a warning message on the remote (e.g., text on the screen indicating "OBSTRUCTED", such as flashing text), a vibrating/haptic signal on remote 210, display the contour of the obstruction on the remote 210, such as based on measurements by the laser distance measurer 180.

As a first example, if the time for the laser level 110 to target the selected target exceeds a predetermined time limit, then an obstruction is flagged and one or more warnings are initiated.

As a second example, if the distance that the targeting laser beam of light 130 is projected jumps over the targeted distance, an obstruction is flagged. For example, if the expected distance to target is 15 feet, and the projected distance of the targeting laser beam of light 130 jumps between 14 feet and 16 feet as the targeting laser beam of light 130 is moved back and forth (e.g., closer to and further from laser level 110), an obstruction is flagged. In various embodiments, laser level 110 includes a threshold distance for jumping distances to avoid flagging a false obstruction.

As another example, if targeting laser beam of light 130 is split between two objects then an error is flagged. In this situation the laser distance measurer 180 measures the distance to each object to determine if the difference is above a threshold. In various embodiments, the different distance measurements are averaged, the minimum distance is used, or the maximum distance is used.

For example, laser level 110 determines whether targeting laser beam of light 130 is aimed at a location that is the expected distance from the laser level. For illustrative and exemplary purposes only, if the ceiling height is 9 feet, and the target point is 12 feet down the run, then the expected distance from the laser level 110 to the target point is 15 feet (a 3-4-5 triangle, with the targeting laser beam of light 130 projecting over the hypotenuse). If the laser level 110 detects that the targeting laser beam of light 130 is projecting on a point 13.5' from the laser level 110, the laser level 110 may initiate one or more warning signals (e.g., an audio alert, a blinking light, a blinking laser beam, a warning on the remote).

In various embodiments, when the laser level 110 detects an obstruction the laser level 110 makes an adjustment similar to the user actions performed at the previous obstruction. For example, if the user previously moved the targeting laser beam of light 130 to the next target so the user could measure backward from the subsequent target, the laser level 110 may immediately target the subsequent target so the user can once again measure backward from the subsequent target.

As another example, laser level 110 may detect that there are two surfaces that are each the same expected distance for the targeting laser beam of light 130 aiming at the actual target 170. In various embodiments, the laser level 110 chooses the first target, the last target, and/or stops at one target and lets the user adjust as necessary.

As another example, laser level 110 may rotate targeting laser beam of light 130 to the expected angle, and if the measured distance is not correct the laser level 110 flags an error.

As another example, laser level 110 may detect the ceiling using a string of points roughly along the same slope. Anything not considered the ceiling is flagged as an obstruction.

In various embodiments, using the laser system 108 and/or laser level 110 includes detecting an obstruction that the targeting laser beam of light 130 is intersecting, and as a result the targeting laser beam of light 130 is forming the target image 131 at a location other than the selected target (e.g., first target 361). The method further includes generating an alert in response to detecting the obstruction and/or an alert signal to a remote that is controlling the laser beam generating device.

In various embodiments, the one or more remotes (e.g., remote 210) described herein are configured to receive an alert signal that the laser level 110 detected an obstruction, and in response to receiving the alert signal, generating an alert. In various embodiments, the alert generated by the remote (e.g., remote 210) is selected from the group consisting of an audio alert, a warning message on a screen of the remote control, and a haptic signal.

At step 324, the user performs adjustments, such as fine adjustments, to work around the obstruction. As one example, the user may adjust targeting laser beam of light 130 to be targeted just after the obstruction and then the user measures backward from where targeting laser beam of light 130 is aimed (e.g., see FIGS. 31-35). As another example, the user may adjust targeting laser beam of light 130 to not intersect the obstruction, and use that new point as the new installation location (e.g., see FIGS. 40-43). In this second example, the user may optionally hit the set button 236 to reconfigure each subsequent point along plurality of targets 360 consistent with the adjustments just made (e.g., if the target points are moved backward 2 inches, then hitting set button 236 will move each subsequent target point backward 2 inches).

As another example, the user may move an obstruction (e.g., the lift the user is on) and instruct the laser level 110 to retry targeting the targeting laser beam of light 130 at the selected target.

As another example, the laser distance measurer 180 may be targeted downward to intersect another object below the obstruction onto some long and/or skinny building material. The user then slides the remote to intersect the targeting laser beam of light 130 and the measurement will adjust on the screen.

As another example, a tape measure is built into remote 210 so that the user has one less object to carry.

As another example, a screen of remote 210 may show readings from a leveling vial and/or a digital vial on the laser level 110 and/or remote 210.

As another example, the remote 210 may include a string potentiometer so the user does not have to pull out tape to make measurements.

As another example, laser level 110 adjust targeting laser beam of light 130 to be horizontal. The user then interrupts the targeting laser beam of light 130 with remote 210, and when the correct distance is reached the user is notified. The user then projects a laser beam up to the ceiling from that point (e.g., using another laser level that projects a vertical line upward).

At step 326, the user then installs the object at the target (e.g., actual target 170, such as on plurality of targets 360) and/or marks the point for later installation.

At step 328, the user then selects the next point for installation. If there are more points then the method cycles back to step 322, and otherwise an alert is generated to the user indicating that all of the points along the run have been installed and/or marked (e.g., the user is at the end of the run).

In various embodiments, remote 210 includes an input option (e.g., a button) that a user presses to help the user find the targeting laser beam of light 130, such as wiggling targeting laser beam of light 130, flashing targeting laser beam of light 130, and/or micro-adjusting targeting laser beam of light 130.

In various embodiments, laser level 110 scans the entire run (e.g., all targets on plurality of targets 360) to detect obstructions and/or issues. Then the user can adjust to the problems before they occur, thereby making the installation of the entire run simpler and/or the points are more consistent with each other. For example, the laser level 110 identifies obstructions then proposed to the user an alternative instruction layout that avoids the obstructions, which the user can then install or not.

In various embodiments, laser level 110 could display all points at once, such as via a galvonometer, or via a rotary laser on its side that selectively turns off/on the laser beam. In various embodiments, magnetic shavings could be on the door on the L bracket. In various embodiments, the speed of the find adjustment changes based on how long the user holds the button down (e.g., the fine adjustment speeds up). In various embodiments, there is an anti-kick strobe on the laser level housing. In various embodiments, the remote 210 can dock on devices within the laser system 108, such as laser level 110. In various embodiments, the laser level 110 includes a Find Me button that triggers an alert from the remote 210 when the remote 210 is lost. In various embodiments, the ceiling height can be input via the remote 210.

In various embodiments, mirrors are remotely controlled to auto-align with the laser beam and get around shadows. In various embodiments, there is an application, that controls the laser level 110. In various embodiments, the laser level 110 can be placed mid-run and project in both directions. In various embodiments, the laser level 110 projects onto the ground from height. In various embodiments, the laser level 110 could be mounted to the ceiling and shot horizontally to intercept with the remote.

Figure 52:
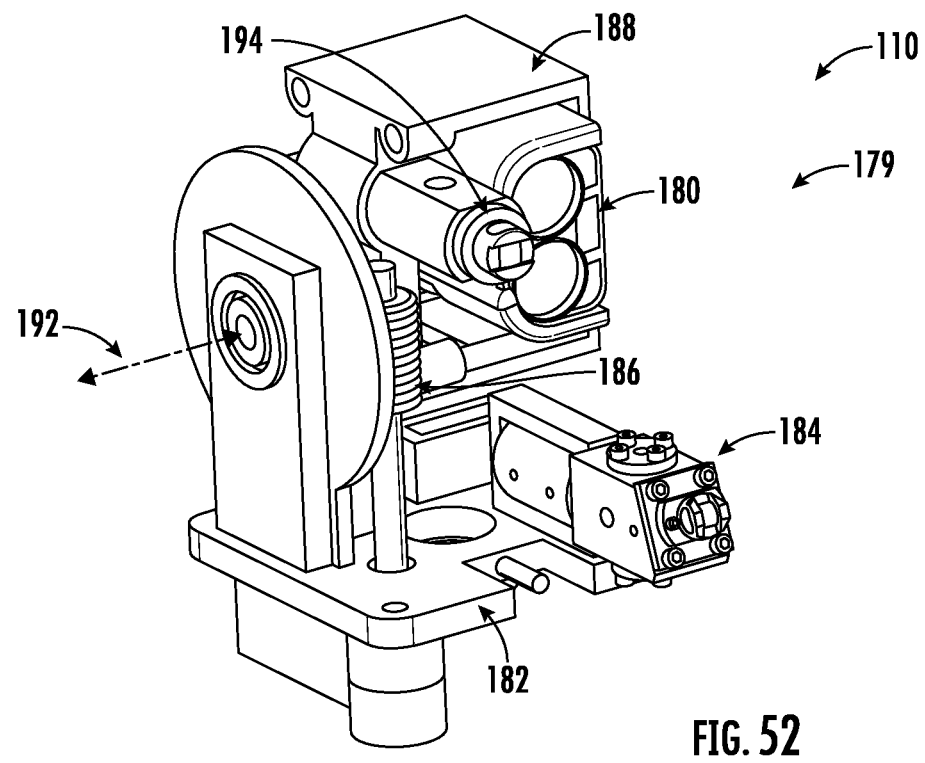
FIGS. 52-53 are internal perspective views of the laser level of FIG. 2, according to an exemplary embodiment.
Figure 53:
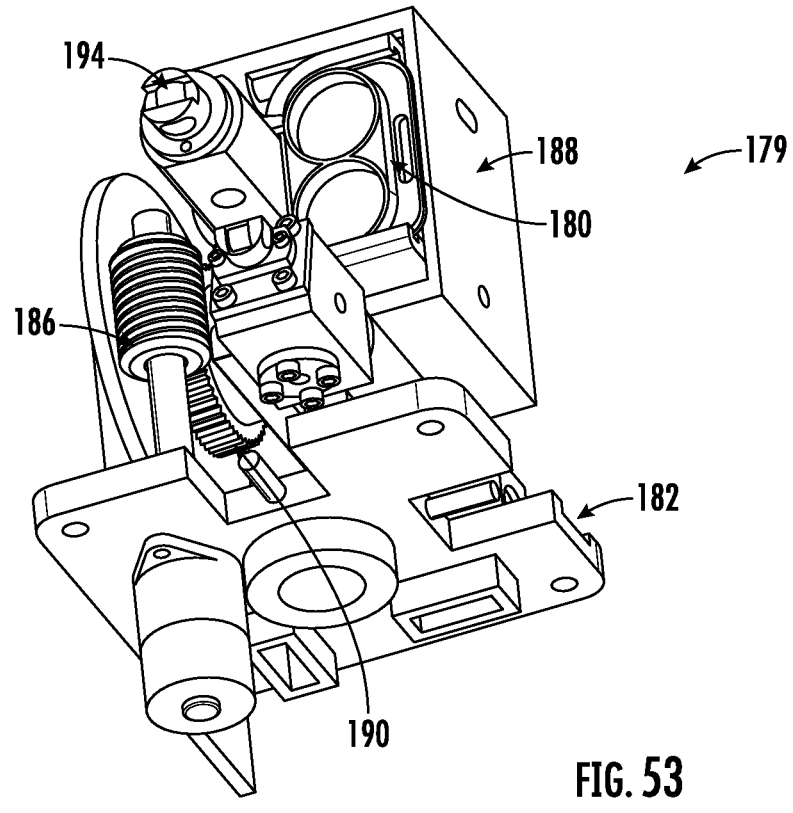

Referring to FIGS. 52-53, various aspects of laser level 110 are shown. In particular, emission platform 179 of laser level 110 is shown. In various embodiments, emission platform 179 is supported on a self-leveling platform, such as via a pendulum, so that emission platform 179 is configured to maintain a consistent orientation with respect to gravity. For example, so that the laser beams emitted by laser diodes 184 are level (e.g., vertical, horizontal) with respect to gravity.

Emission platform 179 includes first platform 182 and one or more laser generating diodes 184, which project laser beam 120 (e.g., the plumb beam aimed down), first output laser beam of light 116 (e.g., the vertical beam that extends along the line of targets), and laser beam plane of light 124 (e.g., the horizontal beam projected forward). In particular, the laser beams that do not pivot when the second platform 188 is rotated with respect to the first platform. Emission platform 179 includes second platform 188 pivotally coupled to first platform 182 such that second platform 188 rotates with respect to first platform 182 about axis 192. In particular, teeth of worm gear 186 are engaged with teeth of circular gear 190, and worm gear 186 is rotated to rotate second platform 188 with respect to first platform 182. As second platform 188 rotates, the one or more laser generating diodes 194, which projects targeting laser beam of light 130, rotates.

In various embodiments, laser distance measurer 180 is coupled to second platform 188 such that laser distance measurer 180 also rotates with respect to first platform 182 and/or housing of laser level 110. In various embodiments, laser distance measurer 180 uses a monocular system (e.g., one lens for sending and receiving laser beam light). In various embodiments, laser distance measurer 180 uses a binocular system (e.g., two lenses for sending and receiving light).

In various embodiments, laser level 110 projects a cross line using multiple lenses, and laser level 110 includes a pendulum, a housing (e.g., emission platform 179) on the pendulum. One or more elements, such as second platform 188, are controlled by a motor. Laser level 110 also includes a customized optic system. In various embodiments, laser level 110 projects a cross line using one or more mirrors with only the mirror moving to adjust the aim, a pendulum on two axes with the minor resting on the pendulum, and when the mirror moves the center of gravity does not change. In various embodiments, laser level 110 includes a 2 plane multi-lens optical system, with the window for the targeting laser beam of light 130 including a cage that moves with the laser.

Figure 54:
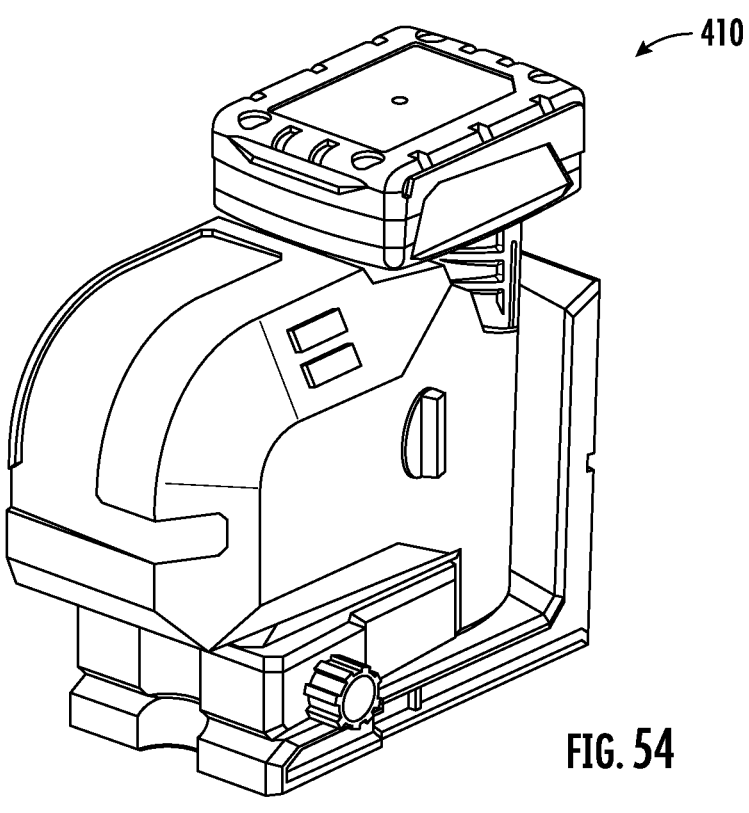
FIGS. 54-55 are internal perspective views of a laser level, according to another exemplary embodiment.
Figure 55:
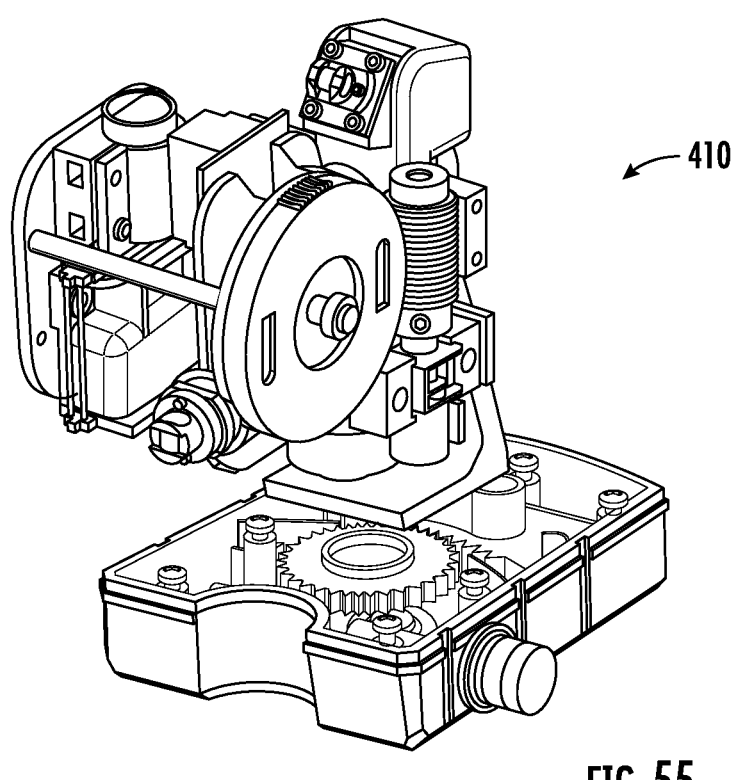

Referring to FIGS. 54-55, various aspects of laser level 410 are shown according to an exemplary embodiment. Laser level 410 is substantially the same as laser level 110 except for the differences discussed herein.

Figure 56:
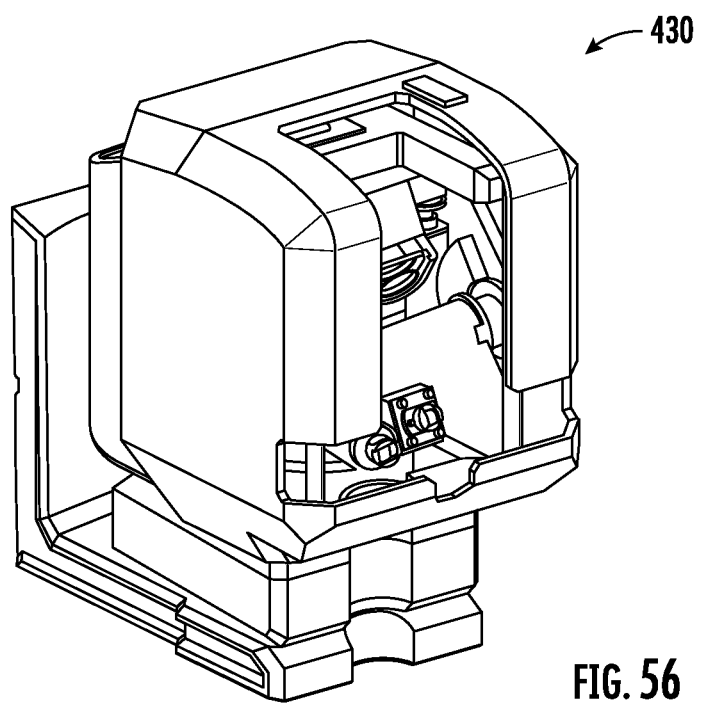
FIGS. 56-57 are internal perspective views of a laser level, according to another exemplary embodiment.
Figure 57:
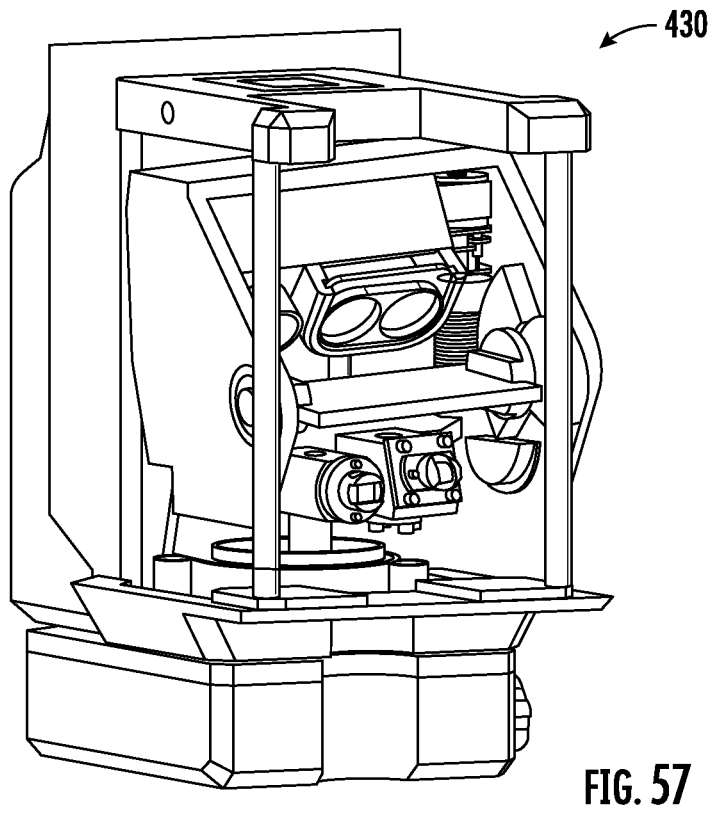

Referring to FIGS. 56-57, various aspects of laser level 430 are shown according to an exemplary embodiment. Laser level 430 is substantially the same as laser level 110 or laser level 410 except for the differences discussed herein.

Figure 58:
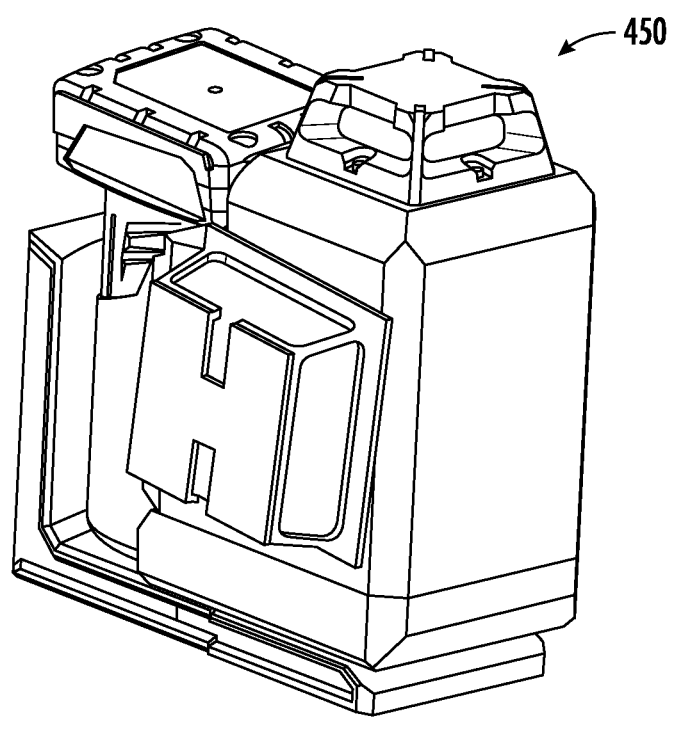
FIGS. 58-59 are internal perspective views of a laser level, according to another exemplary embodiment.
Figure 59:
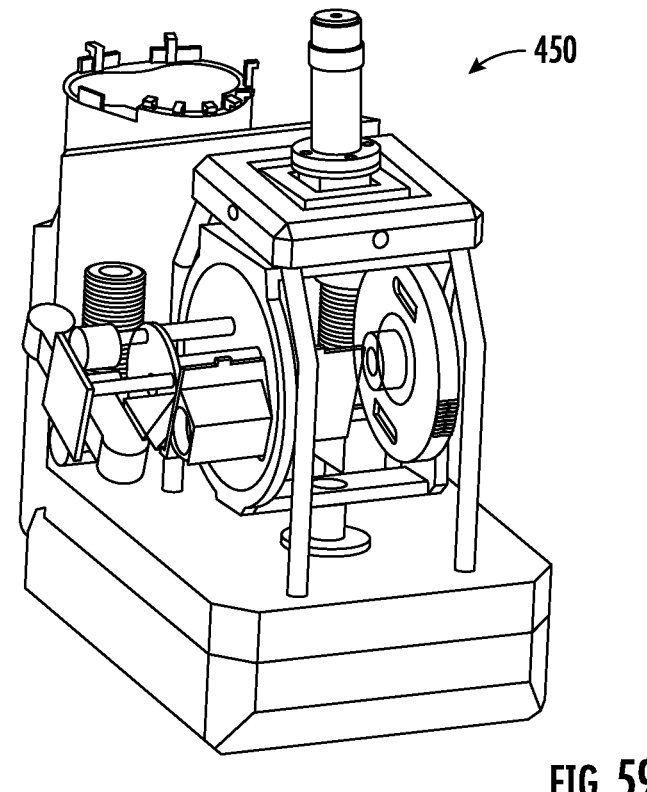

Referring to FIGS. 58-59, various aspects of laser level 450 are shown according to an exemplary embodiment. Laser level 450 is substantially the same as laser level 110, laser level 410, or laser level 430 except for the differences discussed herein.

Figure 60:
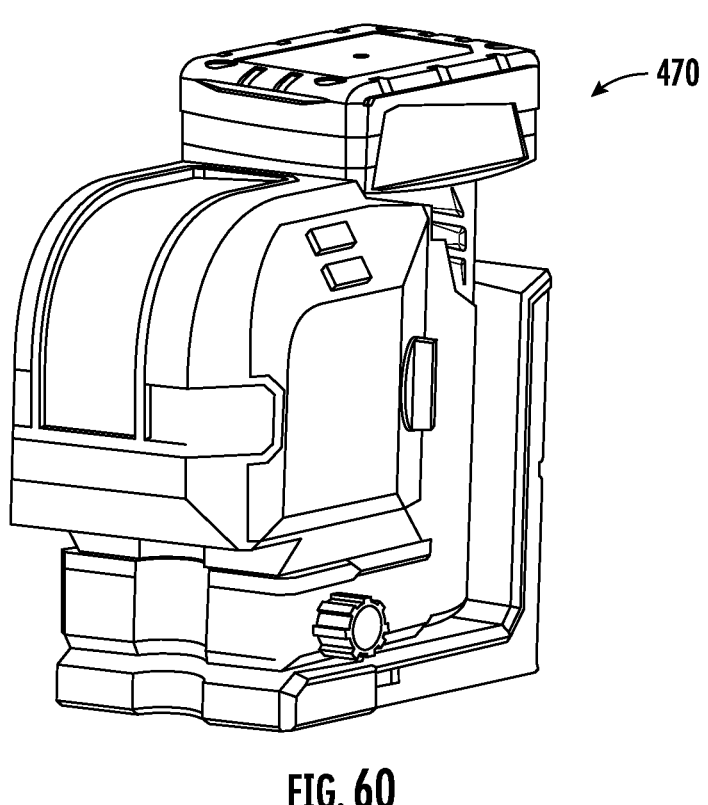
FIGS. 60-61 are internal perspective views of a laser level, according to another exemplary embodiment.
Figure 61:
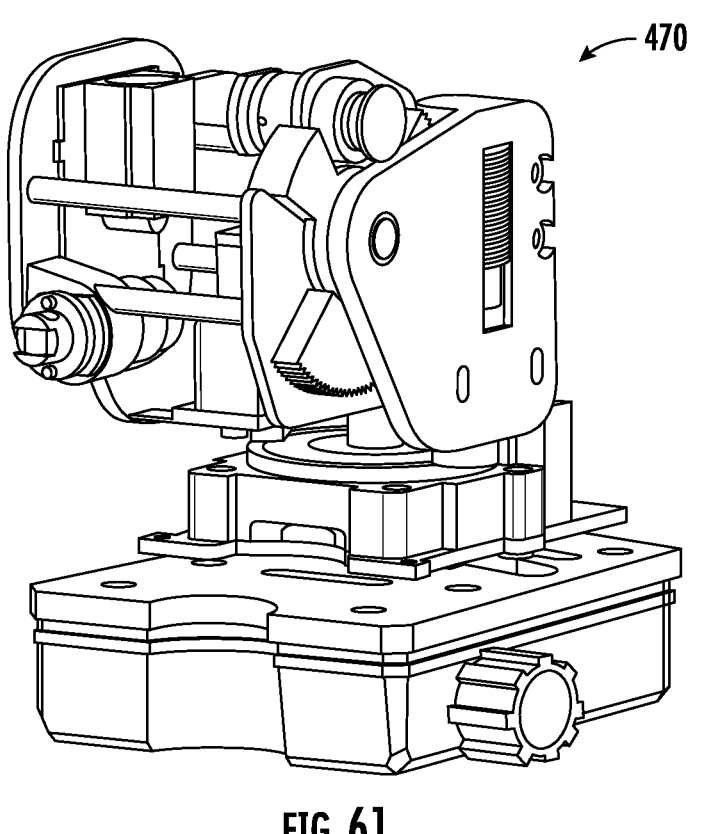
Figures 62, 63, 64, 65, 66, 67, 68, 69:
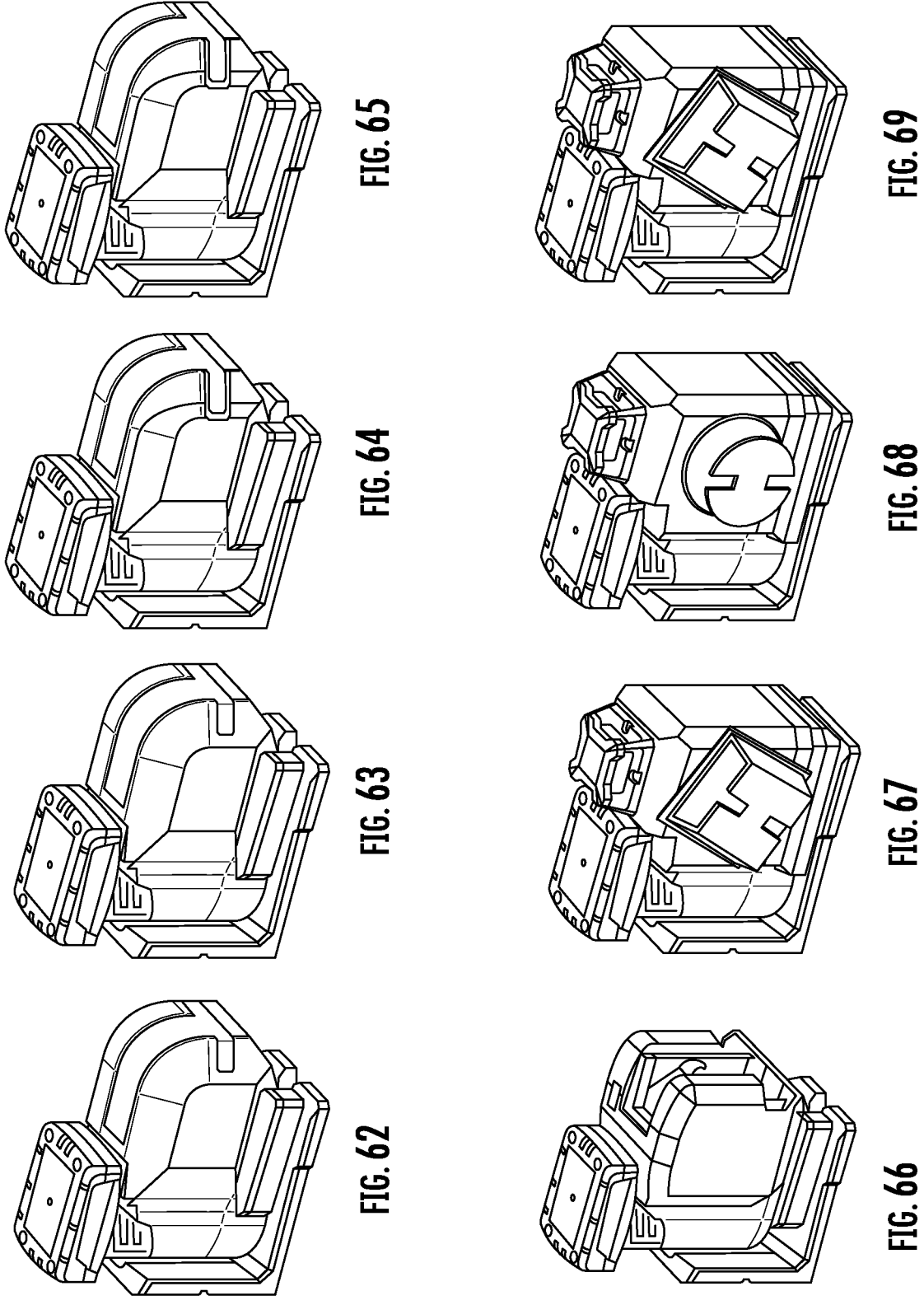
FIGS. 62-69 are internal perspective views of various laser levels, according to additional exemplary embodiments.

Referring to FIGS. 60-61, various aspects of laser level 470 are shown according to an exemplary embodiment. Laser level 470 is substantially the same as laser level 110, laser level 410, laser level 430, or laser level 450 except for the differences discussed herein.

Referring to FIGS. 62-69, various aspects of other laser levels are shown according to an exemplary embodiment. The laser levels in FIGS. 62-69 are substantially the same as laser level 110, laser level 410, laser level 430, laser level 450, or laser level 470 except for the differences discussed herein. The laser level in FIG. 62 includes a pendulum that measures one axis. The laser level in FIG. 63 includes a pendulum that measures one axis and motorized leveling. The laser level in FIG. 64 includes a pendulum that measures one axis and multiple lenses. The laser level in FIG. 65 includes a pendulum that measures one axis and multiple lenses and motorized leveling. The laser level in FIG. 66 includes one or more pendulums that measure two axes, and a minor for projecting one or more laser beams. The laser level in FIG. 67 includes one or more pendulums that measure two axes, and a motorized window that moves to adjust one or more laser beams. The laser level in FIG. 68 includes one or more pendulums that measure two axes, and a static window. The laser level in FIG. 69 includes one or more pendulums that measure two axes, a static window, and motorized leveling.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A laser generating assembly comprising:
a housing;
a first laser generation device coupled to the housing, the first laser generation device configured to generate a first output laser beam of light along a first plane, the first output laser beam of light intersecting an upper surface above the housing to form a first line on the upper surface that extends away from the housing;
a second laser generation device coupled to the housing, the second laser generation device configured to generate a targeting laser beam of light, the targeting laser beam of light projected at the upper surface at a first target intersecting the first line; and
a controller coupled to the housing, the controller configured to:
receive a first signal indicating that the targeting laser beam of light is intersecting a third surface at a first location, wherein the first target is a non-zero first lateral distance from the housing and wherein the first location is a non-zero second lateral distance from the housing that is less than the first lateral distance;
calculate a difference between the first lateral distance and the second lateral distance;
generate a second signal indicating the difference; and
transmit the second signal to a remote device configured to receive the second signal and provide an indication to a user that identifies the difference.

2. The laser generating assembly of claim 1, comprising:
a laser distance measurer coupled to the housing, the laser distance measurer configured to measure the second lateral distance and generate the first signal, which includes the second lateral distance.

3. The laser generating assembly of claim 2, wherein the controller is configured to receive a first information signal from the laser distance measurer, the first information signal indicating a vertical distance of the upper surface above the laser distance measurer.

4. The laser generating assembly of claim 3, wherein the laser distance measurer measuring the second lateral distance is based at least in part on the vertical distance.

5. The laser generating assembly of claim 1, the controller configured to:
   receive a control signal to adjust the targeting laser beam of light; and
   in response to receiving the control signal, adjusting the aim of the targeting laser beam of light a first adjustment distance from the first target such that the targeting laser beam of light intersects the first line at a location the first adjustment distance from the first target.

6. The laser generating assembly of claim 5, wherein the control signal instructs the second laser generation device to adjust the aim the targeting laser beam of light such that the targeting laser beam of light intersects the first line at a second target of a plurality of targets that is distinct from the first target, wherein the plurality of targets includes the first target.

7. The laser generating assembly of claim 5, wherein the control signal instructs the second laser generation device to adjust the aim of the targeting laser beam of light so that the targeting laser beam of light intersects the upper surface at an intersecting location that moves linearly along the first line at a constant speed with respect to the upper surface.

8. The laser generating assembly of claim 5, wherein the control signal instructs the second laser generation device to initially adjust the aim of the targeting laser beam of light so that the targeting laser beam of light intersects the upper surface at an intersecting location that moves linearly along the first line at a first speed with respect to the upper surface for a first length of time, and subsequent to the first length of time at a second speed with respect to the upper surface that is greater than the first speed.

9. The laser generating assembly of claim 1, wherein the remote device is configured to control the first laser generation device and the second laser generation device.

10. The laser generating assembly of claim 1, the controller configured to receive a third signal from the remote device that identifies a plurality of targets that includes the first target.

11. The laser generating assembly of claim 1, wherein the indication is selected from the group consisting of an audio alert, a visual warning message, and a haptic signal.

12. The laser generating assembly of claim 1, wherein the remote device is configured to control the second laser generation device.

13. A laser generating assembly comprising:
   a housing;
   a first laser generation device coupled to the housing, the first laser generation device configured to generate a first output laser beam of light along a first plane, the first output laser beam of light intersecting an upper surface above the housing to form a first line on the upper surface that extends away from the housing;
   a second laser generation device coupled to the housing, the second laser generation device configured to generate a targeting laser beam of light, the targeting laser beam of light projected at the upper surface at a first target intersecting the first line; and a controller coupled to the housing, the controller configured to:
      receive a first signal to adjust the aim of the targeting laser beam of light so the targeting laser beam of light intersects the first line at a first alternate location;
      calculate a non-zero lateral distance between the first alternate location and the first target;
      generate a second signal indicating the lateral distance; and
      transmit the second signal to a remote device configured to receive the second signal and display an indication to a user that identifies the lateral distance.

14. The laser generating assembly of claim 13, comprising:
   a laser distance measurer coupled to the housing, the laser distance measurer configured to measure the lateral distance and generate the first signal, which includes the lateral distance, wherein the controller is configured to receive a first information signal from the laser distance measurer, the first information signal indicating a vertical distance of the upper surface above the laser distance measurer.

15. The laser generating assembly of claim 14, wherein the laser distance measurer measuring the lateral distance is based at least in part on the vertical distance.

16. The laser generating assembly of claim 13, wherein the first signal causes the second laser generation device to adjust the aim of the targeting laser beam of light so that the targeting laser beam of light intersects the upper surface at an intersecting location that moves linearly along the first line at a constant speed with respect to the upper surface.

17. The laser generating assembly of claim 13, wherein the first signal causes the second laser generation device to initially adjust the aim of the targeting laser beam of light so that the targeting laser beam of light intersects the upper surface at an intersecting location that moves linearly along the first line at a first speed with respect to the upper surface for a first length of time, and subsequent to the first length of time at a second speed with respect to the upper surface that is greater than the first speed.

18. A laser generating assembly comprising:
   a housing;
   a first laser generation device coupled to the housing, the first laser generation device configured to generate a first output laser beam of light along a first plane, the first output laser beam of light intersecting an upper surface above the housing to form a first line on the upper surface that extends away from the housing;
   a second laser generation device coupled to the housing, the second laser generation device configured to generate a targeting laser beam of light, the targeting laser beam of light projected at the upper surface at a first target of a plurality of targets, the first target intersecting the first line; and
   a controller coupled to the housing, the controller configured to:
      receive a first signal to adjust the aim of the targeting laser beam of light to a first alternate location intersecting the first line;
      calculate a non-zero lateral distance between the first alternate location and the first target; and
      receive a second signal to adjust a location for each of the plurality of targets that are subsequent to the first target by the lateral distance.

19. The laser generating assembly of claim 18, wherein the controller is further configured to:

in response to receiving the second signal, adjust the location for each of the plurality of targets that are subsequent to the first target by the lateral distance.

20. The laser generating assembly of claim 18, wherein the first signal causes the second laser generation device to adjust the aim of the targeting laser beam of light so that the targeting laser beam of light intersects the upper surface at an intersecting location that moves linearly along the first line at a constant speed with respect to the upper surface.

* * * * *